US011536971B2

United States Patent
Zhou

(10) Patent No.: US 11,536,971 B2
(45) Date of Patent: Dec. 27, 2022

(54) CURVED LENS AND DISPLAY DEVICE

(71) Applicant: BOE TECHNOLOGY GROUP CO., LTD., Beijing (CN)

(72) Inventor: Zhenxing Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 2 days.

(21) Appl. No.: 17/256,423

(22) PCT Filed: May 9, 2020

(86) PCT No.: PCT/CN2020/089375
§ 371 (c)(1),
(2) Date: Dec. 28, 2020

(87) PCT Pub. No.: WO2020/228634
PCT Pub. Date: Nov. 19, 2020

(65) Prior Publication Data
US 2021/0373339 A1 Dec. 2, 2021

(30) Foreign Application Priority Data
May 11, 2019 (CN) .......................... 201910391135.8

(51) Int. Cl.
*G02B 27/01* (2006.01)
*G02B 3/00* (2006.01)

(52) U.S. Cl.
CPC ....... *G02B 27/0172* (2013.01); *G02B 3/0037* (2013.01); *G02B 2027/013* (2013.01)

(58) Field of Classification Search
CPC .............. G02B 27/0172; G02B 3/0037; G02B 3/0062; G02B 2027/0123; G02B 3/00; G02B 27/0178
See application file for complete search history.

(56) References Cited

U.S. PATENT DOCUMENTS

2017/0171533 A1* 6/2017 Benitez ................ H04N 13/383
2018/0052309 A1   2/2018 Lee et al.

FOREIGN PATENT DOCUMENTS

| CN | 103823305 | | 5/2014 | |
|----|-----------|---|--------|---|
| CN | 104932105 | | 9/2015 | |
| CN | 106773010 | | 5/2017 | |
| CN | 206270594 | | 6/2017 | |
| CN | 109425985 A | * | 3/2019 | ............. G02B 27/00 |
| CN | 209728335 | | 12/2019 | |
| KR | 20190036102 | | 4/2019 | |
| WO | WO-2018217252 A1 | * | 11/2018 | ......... G02B 27/0075 |

* cited by examiner

*Primary Examiner* — Alicia M Harrington
(74) *Attorney, Agent, or Firm* — Leason Ellis LLP

(57) ABSTRACT

A curved lens and a display device are provided. The curved lens includes a plurality of sub lenses around an optical center of the curved lens and connected; each of the plurality of sub lenses includes a first and second curved surface opposite to each other; a plurality of first curved surfaces are connected to form a light exit surface of the curved lens, and a plurality of the second curved surfaces are connected to form a light incident surface of the curved lens, and the light exit surface is closer to the optical center of the curved lens compared with the light incident surface; the light incident surface as a whole is a convex surface, and the light exit surface as a whole is a concave surface; the plurality of the first curved surfaces and the plurality of the second curved surfaces are free-form curved surfaces.

19 Claims, 11 Drawing Sheets

CURVED LENS AND DISPLAY DEVICE

CROSS-REFERENCE OF RELATED APPLICATION

This application is a U.S. National Stage Application under 35 U.S.C. § 371 of International Patent Application No. PCT/CN2020/089375, filed May 9, 2020, which claims the benefit of priority of Chinese patent application No. 201910391135.8, filed on May 11, 2019, the disclosure of which is incorporated herein by reference as part of the application. The International Application was published on Nov. 19, 2020, as International Publication No. WO 2020/228634 A1.

TECHNICAL FIELD

Embodiments of the present disclosure relate to a curved lens and a display device.

BACKGROUND

With the development of display technology, virtual reality (VR) display devices and augmented reality (AR) display devices have been widely recognized by users and have been received wide attention received from the industry. The virtual reality devices have advantages in immersion, interaction, imagination and so on; and the augmented reality display devices can realize the integration of external real scene and virtual scene by superimposing the displayed virtual scene image with the external real scene, and thus can improve the user's cognitive ability of the real world.

SUMMARY

At least one embodiment of the present disclosure provides a curved lens, which comprises: a plurality of sub lenses around an optical center of the curved lens and connected with each other. Each of the plurality of sub lenses comprises a first curved surface and a second curved surface opposite to each other; a plurality of first curved surfaces are connected with each other to form a light exit surface of the curved lens, and a plurality of the second curved surfaces are connected with each other to form a light incident surface of the curved lens, and the light exit surface is closer to the optical center of the curved lens compared with the light incident surface; the light incident surface as a whole is a convex surface, and the light exit surface as a whole is a concave surface; and the plurality of the first curved surfaces and the plurality of the second curved surfaces are free-form curved surfaces.

For example, in at least one example of the curved lens, the plurality of sub lenses are identical to each other.

For example, in at least one example of the curved lens, a number of the plurality of sub lenses is an odd number, and a number of the plurality of sub lenses is three.

For example, in at least one example of the curved lens, an angle between adjacent first curved surfaces is greater than 120 degrees.

For example, in at least one example of the curved lens, each of the plurality of sub lenses comprises a plurality of sub-sub lenses around the optical center and connected with each other; each of the sub-sub lenses comprises a first sub curved surface and a second sub curved surface opposite to each other; the first sub curved surface is a first free-form curved surface, and the second sub curved surface is a second free-form curved surface; and a plurality of first sub curved surfaces are connected with each other to form the first curved surface, and a plurality of second sub curved surfaces are connected with each other to form the second curved surface.

For example, in at least one example of the curved lens, each of the plurality of sub lenses comprises two sub-sub lenses, and the two sub-sub lenses are symmetrically relative to a first plane.

For example, in at least one example of the curved lens, an angle between adjacent first sub curved surfaces is greater than 140 degrees.

For example, in at least one example of the curved lens, a central thickness of each of the plurality of sub lenses is greater than 2.5 mm, an edge thickness of each of the plurality of sub lenses is greater than 1.2 mm, and a ratio of the central thickness to the edge thickness of each of the plurality of sub lenses ranges from 1.8 to 2.7.

For example, in at least one example of the curved lens, a surface shape $z1(x, y)$ of each of the plurality of first sub curved surfaces and a surface shape $z2(x, y)$ of each of the plurality of second sub curved surfaces satisfy following expressions (1) and (2), respectively:

$$z1(x, y) = \frac{c1 y^2}{1 + \sqrt{1 - (1+k1)\, c1^2 y^2}} + \sum_{m=0}^{P}\sum_{n=0}^{P} Cmn1 \times x^m y^n, \quad (1)$$

$$z2(x, y) = \frac{c2 y^2}{1 + \sqrt{1 - (1+k2)\, c2^2 y^2}} + \sum_{m=0}^{P}\sum_{n=0}^{P} Cmn2 \times x^m y^n, \quad (2)$$

wherein $c1$ is a curvature radius of each of the plurality of first sub curved surfaces; $k1$ is a quadric surface constant of each of the plurality of first sub curved surfaces, $Cmn1$ is a coefficient of an $(m-n)$th order of each of the plurality of first sub curved surfaces; $c2$ is a curvature radius of each of the plurality of second sub curved surfaces; $k2$ is a quadric surface constant of each of the plurality of second sub curved surfaces; $Cmn2$ is a coefficient of an $(m-n)$th order of the plurality of second sub curved surfaces; and $m+n$ is greater than or equal to 1 and less than or equal to $P$.

For example, in at least one example of the curved lens, in a case where a value of M is an odd number, values of $Cmn1$ and $Cmn2$ are zero; and in a case where a value of $m+n$ is an odd number, a sum of coefficients of $(m-n)$th orders of the plurality of first sub curved surfaces is equal to zero, and a sum of coefficients of $(m-n)$th orders of the plurality of second sub curved surfaces is equal to zero.

For example, in at least one example of the curved lens, an absolute value of $c2$ is greater than an absolute value of $c1$; and a ratio of the absolute value of $c2$ to the absolute value of $c1$ ranges from 3 to 7.

For example, in at least one example of the curved lens, a first curved line obtained by sectioning two adjacent first curved surfaces by a first plane comprises a portion of a first M-shape; the portion of the first M-shape comprises two first convex points, and the first curved line is entirely on a same side of a virtual line connecting the two first convex points; a second curved line obtained by sectioning two adjacent second curved surfaces by the first plane comprises a ridge-shaped portion; a second curved line obtained by sectioning two adjacent first sub curved surfaces by a second plane comprises a portion of a second M-shape; and the portion of the second M-shape comprises two second convex points, and the second curved line is entirely on a same side of a virtual line connecting the two second convex points.

For example, in at least one example of the curved lens, the curved lens is integrally molded, so that there is no interface between adjacent sub lenses.

For example, in at least one example of the curved lens, pupils of the plurality of sub lenses are at different positions and around the optical center of the curved lens.

For example, in at least one example of the curved lens, the optical center of the curved lens is on a side of the pupils of the plurality of sub lenses away from the curved lens.

For example, in at least one example of the curved lens, the optical center of the curved lens is an intersection point of axes of the plurality of sub lenses; and an axis of each of the plurality of sub lenses is perpendicular to a plane where a pupil of the each of the plurality of sub lenses are located.

At least one embodiment of the present disclosure provides another curved lens, which comprises a plurality of sub lenses around an optical center of the curved lens and connected with each other; each of the plurality of sub lenses includes a first curved surface and a second curved surface opposite to each other; a plurality of the first curved surfaces are connected with each other to form a light exit surface of the curved lens, and a plurality of the second curved surfaces are connected with each other to form a light incident surface of the curved lens. The light exit surface is closer to the optical center of the curved lens compared with the light incident surface; the light incident surface is a convex surface on the whole, and the light exit surface is a concave surface on the whole; and pupils of the plurality of sub lenses are located at different positions and around the optical center of the curved lens.

For example, in at least one example of another curved lens, the optical center of the curved lens is on a side of the pupils of the plurality of sub lenses away from the curved lens.

For example, in at least one example of another curved lens, the optical center of the curved lens is an intersection point of axes of the plurality of sub lenses; and an axis of each of the plurality of sub lenses is perpendicular to a plane where a pupil of the each of the plurality of sub lenses are located.

For example, in at least one example of another curved lens, the plurality of sub lenses are identical to each other.

For example, in at least one example of another curved lens, a number of the plurality of sub lenses is an odd number, and a number of the plurality of sub lenses is three.

For example, in at least one example of another curved lens, an angle between adjacent first curved surfaces is greater than 120 degrees.

For example, in at least one example of another curved lens, each of the plurality of sub lenses comprises a plurality of sub-sub lenses around the optical center and connected with each other; each of the sub-sub lenses comprises a first sub curved surface and a second sub curved surface opposite to each other; the first sub curved surface is a first free-form curved surface, and the second sub curved surface is a second free-form curved surface; and a plurality of first sub curved surfaces are connected with each other to form the first curved surface, and a plurality of second sub curved surfaces are connected with each other to form the second curved surface.

For example, in at least one example of another curved lens, each of the plurality of sub lenses comprises two sub-sub lenses, and the two sub-sub lenses are symmetrically relative to a first plane.

For example, in at least one example of another curved lens, an angle between adjacent first sub curved surfaces is greater than 140 degrees.

For example, in at least one example of another curved lens, a central thickness of each of the plurality of sub lenses is greater than 2.5 mm, an edge thickness of each of the plurality of sub lenses is greater than 1.2 mm, and a ratio of the central thickness to the edge thickness of each of the plurality of sub lenses ranges from 1.8 to 2.7.

For example, in at least one example of another curved lens, a surface shape $z1(x, y)$ of each of the plurality of first sub curved surfaces and a surface shape $z2(x, y)$ of each of the plurality of second sub curved surfaces satisfy following expressions (1) and (2), respectively:

$$z1(x, y) = \frac{c1y^2}{1 + \sqrt{1 - (1+k1)\, c1^2 y^2}} + \sum_{m=0}^{P}\sum_{n=0}^{P} Cmn1 \times x^m y^n, \quad (1)$$

$$z2(x, y) = \frac{c2y^2}{1 + \sqrt{1 - (1+k2)\, c2^2 y^2}} + \sum_{m=0}^{P}\sum_{n=0}^{P} Cmn2 \times x^m y^n, \quad (2)$$

wherein c1 is a curvature radius of each of the plurality of first sub curved surfaces; k1 is a quadric surface constant of each of the plurality of first sub curved surfaces, Cmn1 is a coefficient of an (m−n)th order of each of the plurality of first sub curved surfaces; c2 is a curvature radius of each of the plurality of second sub curved surfaces; k2 is a quadric surface constant of each of the plurality of second sub curved surfaces; Cmn2 is a coefficient of an (m−n)th order of the plurality of second sub curved surfaces; and m+n is greater than or equal to 1 and less than or equal to P.

For example, in at least one example of another curved lens, in a case where a value of M is an odd number, values of Cmn1 and Cmn2 are zero; and in a case where a value of m+n is an odd number, a sum of coefficients of (m−n)th orders of the plurality of first sub curved surfaces is equal to zero, and a sum of coefficients of (m−n)th orders of the plurality of second sub curved surfaces is equal to zero.

For example, in at least one example of another curved lens, an absolute value of c2 is greater than an absolute value of c1; and a ratio of the absolute value of c2 to the absolute value of c1 ranges from 3 to 7.

For example, in at least one example of another curved lens, a first curved line obtained by sectioning two adjacent first curved surfaces by a first plane comprises a portion of a first M-shape; the portion of the first M-shape comprises two first convex points, and the first curved line is entirely on a same side of a virtual line connecting the two first convex points; a second curved line obtained by sectioning two adjacent second curved surfaces by the first plane comprises a ridge-shaped portion; a second curved line obtained by sectioning two adjacent first sub curved surfaces by a second plane comprises a portion of a second M-shape; and the portion of the second M-shape comprises two second convex points, and the second curved line is entirely on a same side of a virtual line connecting the two second convex points.

At least one embodiment of the present disclosure further provides a display device, which comprises the curved lens provided by any embodiment of the present disclosure.

For example, in at least one example of the display device, the display device further comprises a plurality of display channels, wherein the plurality of sub lenses of the curved lens are in one-to-one correspondence with the plurality of display channels; and each of the plurality of sub lenses is arranged in a corresponding display channel.

For example, in at least one example of the display device, imaging surfaces of the plurality of display channels are on a same curved surface or on a same plane.

For example, in at least one example of the display device, in a case where the imaging surfaces of the plurality of display channels are on the same plane, the imaging surfaces of the plurality of display channels are all perpendicular to a global axis of the curved lens.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art may obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "comprise/comprising," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may comprise an electrical connection/coupling, directly or indirectly. The terms, "on," "under," "left," "right," or the like are only used to indicate relative position relationship, and when the position of the object which is described is changed, the relative position relationship may be changed accordingly.

The inventor of the present disclosure has noticed in research that the resolution of a display device can be improved by splicing (combining) a plurality of display channels. However, the display effect of the above-mentioned display device obtained by splicing the plurality of display channels is poor. The following is an exemplary description with reference to FIG. 1A.

Figure 1A:
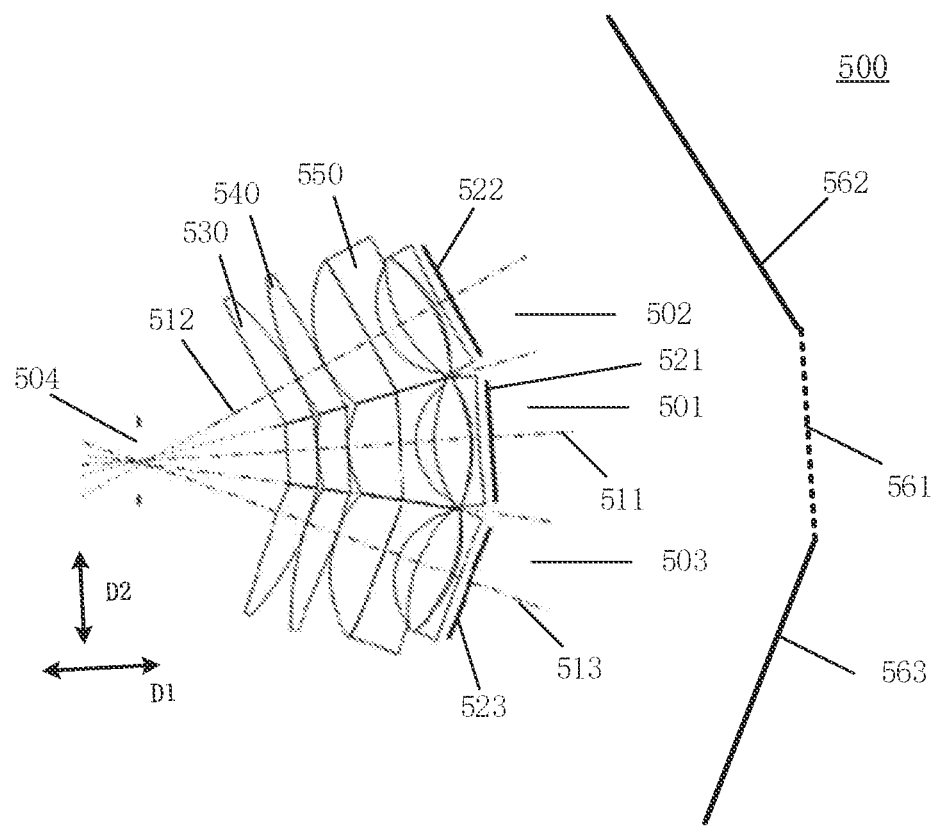
FIG. 1A is a structural diagram of a display device.
Figure 1B:
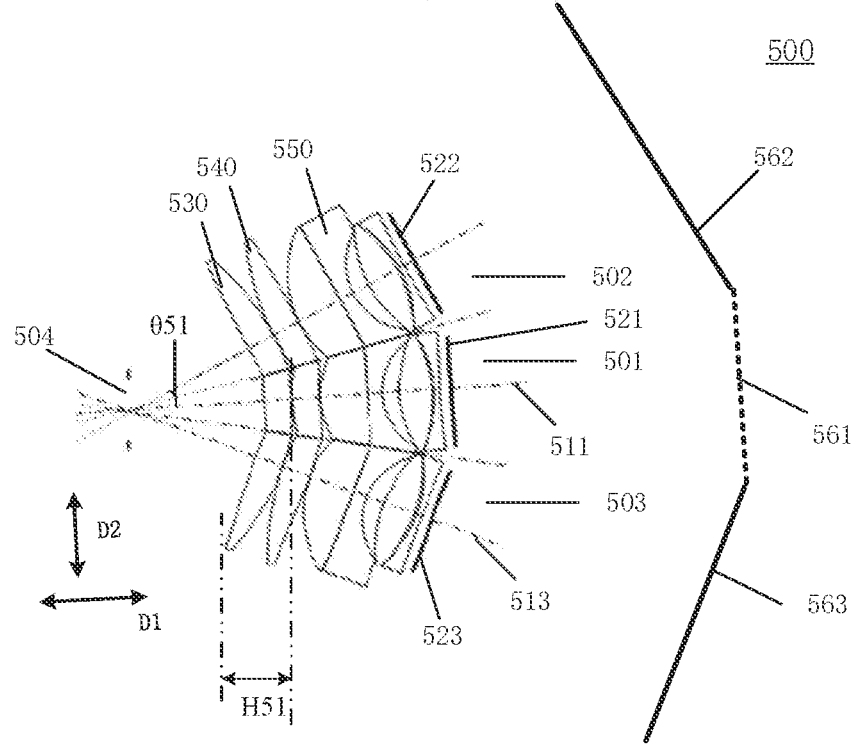
FIG. 1B is another structural diagram of the display device in FIG. 1A.

FIG. 1A is a cross-sectional diagram of a display device 500, and FIG. 1B is another cross-sectional diagram of the display device 500 in FIG. 1A. The display device 500 in FIG. 1A and FIG. 1B can be implemented as a near-eye display device or a head-mounted display device. For example, the display device 500 in FIG. 1A and FIG. 1B can be implemented as a virtual reality display device or an augmented reality display device. For example, the display device 500 in FIG. 1A and FIG. 1B may correspond to a single lens of virtual reality glasses.

As illustrated in FIG. 1A and FIG. 1B, the display device 500 includes a plurality of display channels, and a plurality of display screens, and further includes a plurality of splicing lenses that are overlapped with each other; the plurality of display screens are respectively arranged in the plurality of display channels; the plurality of display screens respectively display a plurality of initial sub-images; the plurality of splicing lenses that are overlapped are configured to image the plurality of initial sub-images to form a plurality of display sub-images that are connected with each other, and the plurality of display sub-images that are connected with each other form the image displayed by the display device. Pupils of the plurality of display channels are all located at the pupil of the display device 500. For example, as illustrated in FIG. 1A and FIG. 1B, the plurality of display screens are spaced apart from each other.

For example, as illustrated in FIG. 1A and FIG. 1B, the plurality of display channels may be a first display channel 501, a second display channel 502, and a third display channel 503, and the plurality of display screens may be a first display screen 521, a second display screen 522 and a third display screen 523; the above-mentioned plurality of splicing lenses include a first splicing lens 530, a second splicing lens 540, and a third splicing lens 550, which are located in the first display channel 501, the second display channel 502, and the third display channel 503; the first display screen 521, the second display screen 522, and the third display screen 523 are respectively located in the first display channel 501, the second display channel 502, and the third display channel 503, and are respectively configured to display a first initial sub-image, a second initial sub-image and a third initial sub-image; the plurality of splicing lenses that are overlapped are configured to image the first initial sub-image, the second initial sub-image and the third initial sub-image, so as to form a first display sub-image 561, a second display sub-image 562 and a third display sub-image 563 that are connected with each other.

As illustrated in FIG. 1A and FIG. 1B, the first display channel 501, the second display channel 502, and the third display channel 503 respectively have a first optical axis 511, a second optical axis 512, and a third optical axis 513. For example, the splicing lens (for example, each of the above-mentioned plurality of splicing lenses that are overlapped) is obtained by splicing a plurality of (for example, three) sub lenses with rotational symmetry properties (for example, relative to the optical axis of the corresponding display channel). For example, optical axes of the plurality of sub lenses are coincident with optical axes of the plurality of display channels, respectively. For example, the number of the above-mentioned plurality of sub lenses with rotational symmetry properties is equal to the number of the plurality of display channels. For example, the plurality of sub lenses with rotational symmetry properties are respectively located in the plurality of display channels. For example, as illustrated in FIG. 1A and FIG. 1B, the above-mentioned sub lenses with rotational symmetry properties refer to sub lenses that have rotational symmetry properties before being cut, and may not have rotational symmetry properties after being cut.

For example, the first splicing lens 530 can be obtained by the following method. First, three lenses with rotational symmetry properties are cut to obtain three cut sub lenses; then, the three cut sub lenses are allowed to be correspond to three display channels of the display device; and then, the three cut sub lenses are spliced with each other to obtain the first splicing lens 530.

For example, the first direction D1 as illustrated in FIG. 1A and FIG. 1B may along the direction from the user wearing the display device 500 to the front of the user, and the second direction D2 as illustrated in FIG. 1A and FIG. 1B may be a vertical direction (for example, the direction of gravity). For example, when the user's eyeball (the pupil of the eyeball) is located at the pupil 504 of the display device 500, the user can see the plurality of display sub-images displayed by the display device 500. However, the inventor of the present disclosure has noticed that the first splicing lens 530 and the display device 500 as illustrated in FIG. 1A and FIG. 1B may have at least one of the following three problems:

First, as illustrated in FIG. 1B, the deflection angle between optical axes of adjacent sub lenses (for example, the angle θ51 between the optical axis of the sub lens located in the first display channel 501 and the optical axis of the sub lens located in the second display channel 502) is relatively large, which makes smooth transition of adjacent sub lenses be difficult, and makes the overall thickness H51 of the splicing lens thicker. In this case, it is difficult to form the above-mentioned splicing lens through an integrated manufacture process (for example, integrated injection molding), and it is necessary to form the above-mentioned splicing lens by sectioning and then splicing; however, the splicing lens obtained by sectioning and then splicing may have splicing gap, which decreases the display effect of the display device 500 and the user experience.

Second, as illustrated in FIG. 1A and FIG. 1B, pupils of the plurality of display channels are all located at the same position (for example, at the pupil of the display device 500). Therefore, when the user wearing the display device 500 is looking straight ahead, the light output by the display device 500 (the light used to form a display image) can be better received. However, when the eyeball of the user wearing the display device 500 rotates (for example, rotates upward or downward), the pupil of the user deviates from the pupil of the display device 500. In this case, the intensity of light output from the display device 500 and received by the pupil is reduced, thereby decreasing the display effect of the display device 500 and the user experience.

Third, as illustrated in FIG. 1A and FIG. 1B, the plurality of display sub-images are located on different planes, and the planes on which adjacent display sub-images are located intersect each other, which makes the user perceive that the adjacent display sub-images are not in a same display screen, and the display effect of the display device 500 and the user experience can be further decreased.

At least one embodiment of the present disclosure provides a curved lens and a display device. The curved lens includes a plurality of sub lenses around an optical center of the curved lens and connected with each other; each of the plurality of sub lenses includes a first curved surface and a second curved surface opposite to each other; a plurality of first curved surfaces are connected with each other to form a light exit surface of the curved lens, and a plurality of the second curved surfaces are connected with each other to form a light incident surface of the curved lens, and the light exit surface is closer to the optical center of the curved lens compared with the light incident surface; the light incident surface is a convex surface on the whole, and the light exit surface is a concave surface on the whole.

In some examples, the pupil is the image formed by the aperture stop of the optical system (for example, sub lens) in the image space of the optical system. For example, the aperture stop of the optical system (for example, sub lens) is located at the same position as the pupil of the optical system. In at least one embodiment of the present disclosure, the pupil refers to the exit pupil of the optical system (final product); in simulation using optical software based on reverse tracking, the exit pupil is designated as the entrance pupil.

In some examples, the curved lens can be used in a near-eye display device or a head-mounted display device. For example, the curved lens can be used in a virtual reality display device or an augmented reality display device. For example, the curved lens can be used as part component of a single lens of virtual reality glasses.

In some examples, the curved lens can reduce the angle (or deflection angle) between adjacent sub lenses, thereby reducing the overall thickness of the curved lens and making it possible to form the curved lens by an integrated manufacture process (e.g., integrated injection molding).

In some examples, pupils of the plurality of sub lenses are located at different positions, thereby reducing the angle between adjacent sub lenses and improving the display effect of the display device including the curved lens.

In some examples, the plurality of the first curved surfaces and the plurality of the second curved surfaces may be free-form curved surfaces, thereby reducing the angle between adjacent sub lenses.

In some examples, imaging surfaces of the plurality of sub lenses (the plurality of display channels including the plurality of sub lenses) are located on a same curved surface or on a same plane. In this case, the transition of the splicing positions between the plurality of display sub-images is smooth, thereby improving the display effect of the display device including the curved lens.

In the following, the curved lens and the display device provided by at least one embodiment of the present disclosure are described in a non-limiting manner with reference to several examples. As described below, in case of no conflict, different features in these embodiments or specific examples may be combined with each other to obtain new embodiments or examples, which also fall within the protection scope of the present disclosure.

Figure 2:
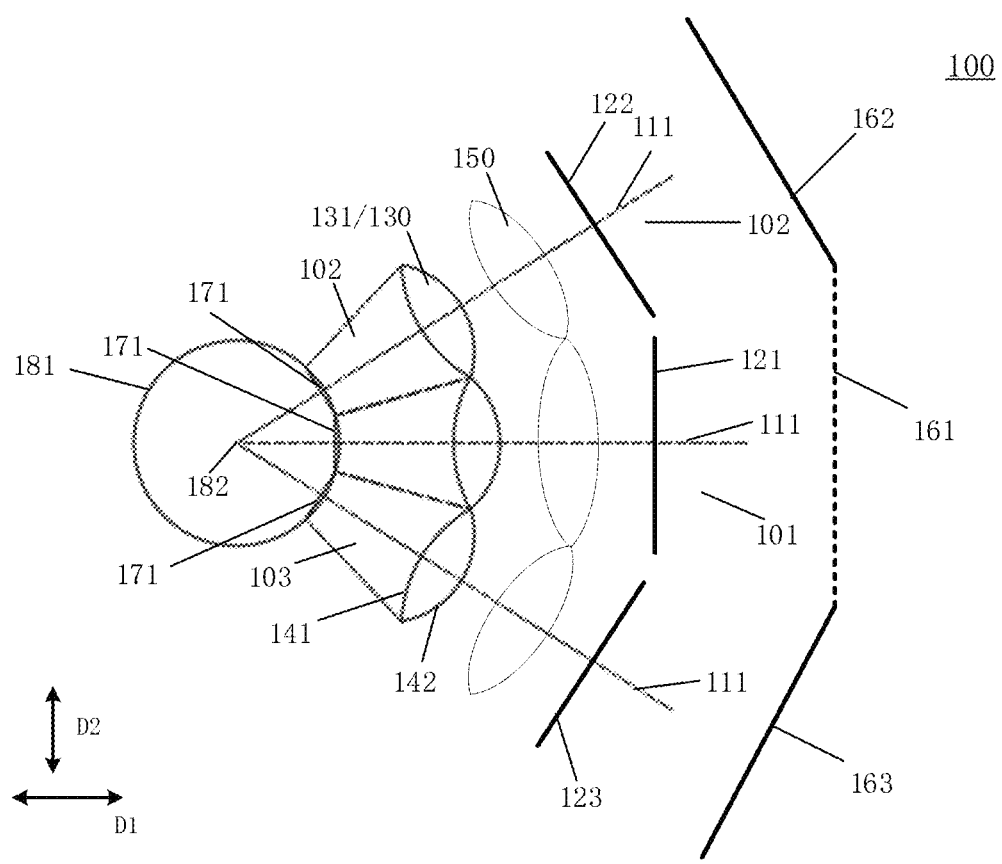
FIG. 2 is a cross-sectional diagram of a curved lens and a display device provided by at least one embodiment of the present disclosure.
Figure 9A:
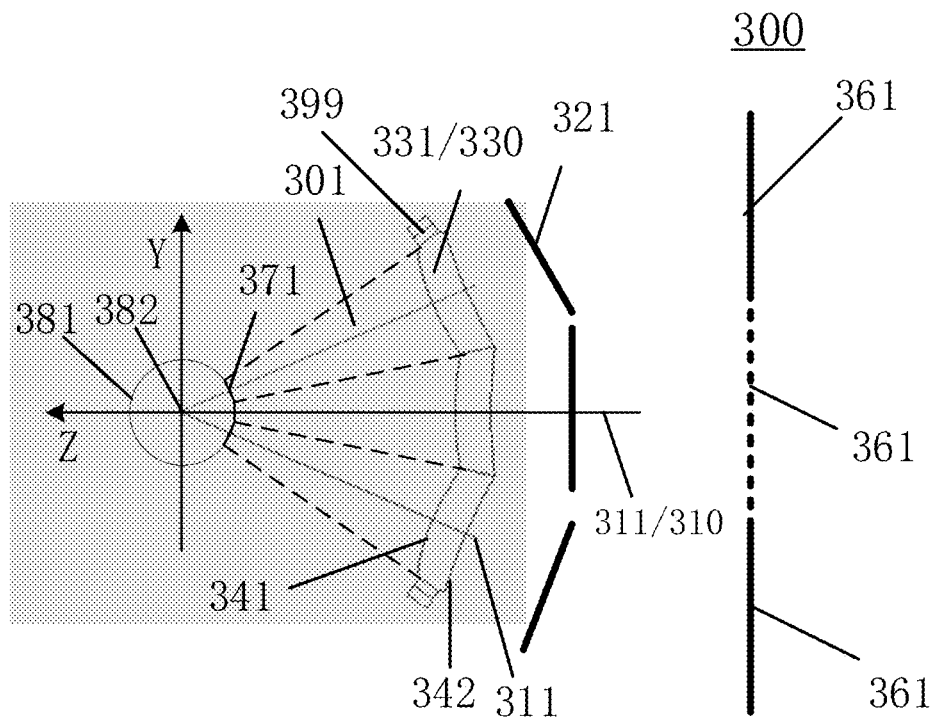
FIG. 9A is a cross-sectional diagram obtained by sectioning a display device including the curved lens illustrated in FIG. 7A by the first plane.

FIG. 2 is a cross-sectional diagram of a curved lens 130 and a display device 100 provided by at least one embodiment of the present disclosure; for ease of description, FIG. 2 and other drawings (for example, FIG. 3A, FIG. 3B, FIG. 4A, and FIG. 4B) also show the eyeball of the user wearing the display device 100 (for example, the eyeball 181 in FIG. 2 and the eyeball 381 in FIG. 9A). The first direction D1 as illustrated in FIG. 2 may be along the direction from the user wearing the display device 100 to the front of the user wearing the display device 100, and the second direction D2 as illustrated in FIG. 2 may be a vertical direction (for example, the direction of gravity).

As illustrated in FIG. 2, the display device 100 includes a plurality of display channels (for example, a first display channel 101, a second display channel 102, and a third display channel 103), a plurality of display screens (for example, a first display screen 121, a second display screen 122 and a third display screen 123), a curved lens 130, and a lens group 150 that is stacked with the curved lens 130. For example, as illustrated in FIG. 2, the plurality of display screens are spaced apart from each other. For example, the plurality of display screens can be controlled independently. For example, the plurality of display channels are not overlapped with each other.

For example, as illustrated in FIG. 2, the curved lens 130 may be an optical component of the display device 100 closest to the light emitting side of the display device 100 (that is, the last optical component; for example, the last lens). For example, the difficulty in designing the curved lens 130, which is closest to the light emitting side of the display device 100, of the display device 100 is generally greater than the difficulty in designing other optical components of the display device 100.

It should be noted that, for clarity, FIG. 2 uses a biconvex lens to schematically illustrate the lens group 150 that is stacked with the curved lens 130, but the structure of the lens group 150 is not limited to the example as illustrated in FIG. 2.

As illustrated in FIG. 2, the plurality of display screens are respectively arranged in the plurality of display channels, for example, each of the plurality of display screens is completely located in a corresponding display channel; the plurality of display screens respectively display a plurality of initial sub-images (for example, a first initial sub-image, a second initial sub-image, and a third initial sub-image); the curved lens 130 and the lens group 150 that is stacked with the curved lens 130 are configured to image the plurality of initial sub-images to form a plurality of display sub-images (for example, a first display sub-image 161, a second display sub-image 162, and a third display sub-image 163) connected with each other.

As illustrated in FIG. 2, the curved lens 130 includes a plurality of sub lenses 131 arranged around (for example, partially around) the optical center 182 of the curved lens 130 and connected with each other. For example, the plurality of sub lenses 131 of the curved lens 130 are in one-to-one correspondence with the plurality of display channels; each of the plurality of sub lenses 131 is arranged (for example, completely located) in a corresponding display channel. For example, the optical center 182 of the curved lens 130 refers to the intersection of the axis 111 (the axis of the display channels where the plurality of sub lenses 131 are located) of the plurality of sub lenses 131.

As illustrated in FIG. 2, each of the plurality of sub lenses 131 includes a first curved surface 141 and a second curved surface 142 opposite to each other, for example, a first curved surface 141 and a second curved surface 142 opposite to each other in the light path adjustment direction. A plurality of first curved surfaces 141 are connected with each other to form a light exit surface of the curved lens 130, and a plurality of second curved surfaces 142 are connected with each other to form a light incident surface of the curved lens 130. The light exit surface is closer to the optical center 182 of the curved lens 130 compared with the light incident surface. For example, the first curved surface 141 and the second curved surface 142 are opposite to each other in the extending direction of the axis 111 of a corresponding sub lens 131.

As illustrated in FIG. 2, the pupils 171 of the plurality of sub lenses 131 are located at different positions, and are arranged around (for example, partially around) the optical center 182 of the curved lens 130; the optical center 182 of the curved lens 130 is located on the side of the pupils 171 of the plurality of sub lenses 131 away from the curved lens 130. For example, as illustrated in FIG. 2, the pupils 171 of the plurality of sub lenses 131 are not overlapped with each other.

For example, when the user wears the display device 100, the pupils 171 of the plurality of sub lenses 131 may be arranged around (for example, partially around) the user's eyeball, thereby allowing the user's pupil to better receive the output light of the display device 100 for forming the sub-images. For example, the pupils 171 of the plurality of sub lenses 131 may be located at different positions on the surface of the user's eyeball. For example, the center of the user's eyeball may be located at the optical center 182 of the curved lens 130, for example, the center of the user's eyeball may be approximately at the optical center 182 of the curved lens 130, as long as the user can obtain an acceptable visual effect. For example, when the user's eyeball is turned upward to observe the second display sub-image 162, the user's pupil can better receive the light used to form the second display sub-image 162, thereby improving the display effect of the display device 100. For example, compared with the display device 500 as illustrated in FIG. 1A and FIG. 1B, when the user wears the display device 100, and when the user's eyeball is turned upward to observe the second display sub-image 162, the user's pupil can receive more light used to form the second display sub-image 162.

For example, the axis 111 of each of the plurality of sub lenses 131 is perpendicular to the plane where the pupil 171 of the sub lens 131 is located, so that the pupil of the user can better receive the light used to form the display sub-image, which can further improve the display effect of the display device 100.

In some examples, by arranging the pupils 171 of the plurality of sub lenses 131 at different positions and arranged around (for example, partially around) the optical center 182 of the curved lens 130, the angle (or deflection angle) between adjacent sub lenses 131 can also be reduced, thereby reducing the overall thickness of the curved lens 130, and making it possible to form the curved lens 130 through an integrated manufacture process (for example, integrated injection molding); accordingly, the material for forming the curved lens 130 can be appropriately selected. For example, PMMA (polymethyl methacrylate) is selected. The embodiments of the present disclosure are not limited in this aspect. An illustrative description will be given below in conjunction with FIG. 3A, FIG. 3B, FIG. 4A, and FIG. 4B.

Figure 3A:
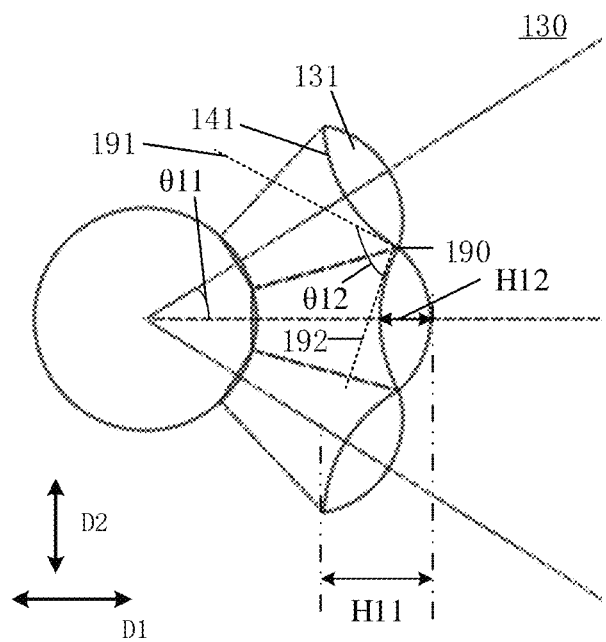
FIG. 3A is another diagram of the curved lens in FIG. 2.
Figure 3B:
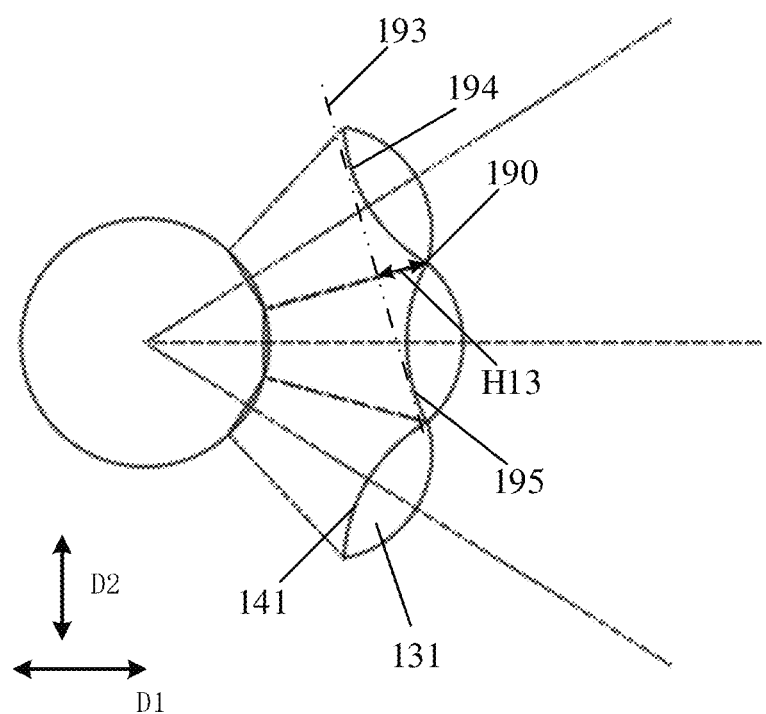
FIG. 3B is further another diagram of the curved lens in FIG. 2.
Figure 4A:
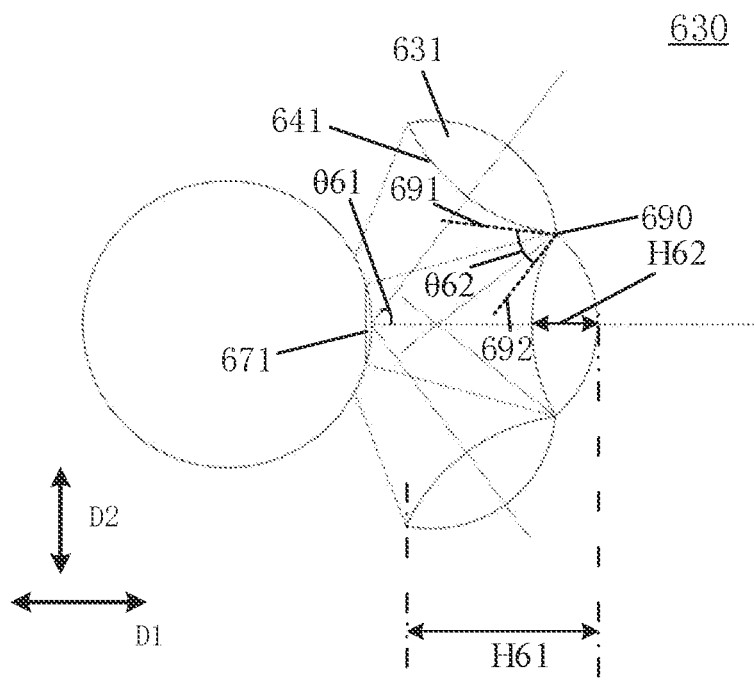
FIG. 4A is a cross-sectional diagram of a curved lens.
Figure 4B:
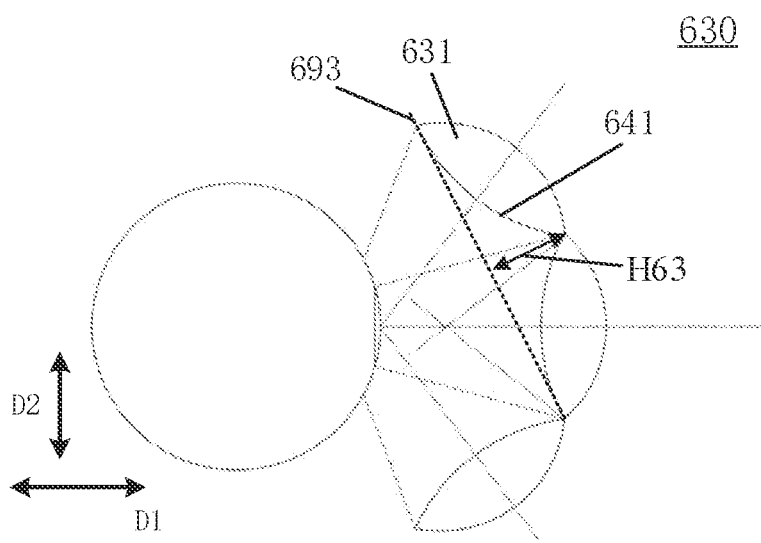
FIG. 4B is another cross-sectional diagram of the curved lens in FIG. 4A.

FIG. 3A shows another diagram of the curved lens 130 as illustrated in FIG. 2, and FIG. 3B shows further another diagram of the curved lens 130 as illustrated in FIG. 2; for comparison, FIG. 4A shows a diagram of a curved lens 630 with single pupil 671, and FIG. 4B shows another diagram of the curved lens 630 with single pupil.

As illustrated in FIG. 3A and FIG. 4A, the deflection angle θ11 of the curved lens 130 with multi-pupil is smaller than the deflection angle θ61 of the curved lens 630 with single pupil; the angle θ12 between adjacent sub lenses 131 of the curved lens 130 with multi-pupil is smaller than the angle θ62 between adjacent sub lenses 631 of the curved lens 630 with single pupil; and the overall thickness H11 of the curved lens 130 with multi-pupil is smaller than the overall thickness H61 of the curved lens 630 with single pupil.

It should be noted that the curved lens 130 with multi-pupil refers to that pupils 171 of the plurality of sub lenses 131 of the curved lens 130 are located at different positions; and the curved lens 630 with single pupil refers to that pupils 671 of the plurality of sub lenses 631 of the curved lens 630 are all located at the same position (for example, the position where the pupil 671 of the display device including the curved lens 630 is located).

As illustrated in FIG. 3A, the deflection angle of the curved lens 130 refers to the angle between the axes 111 of adjacent sub lenses 131 of the curved lens 130. As illustrated in FIG. 3A and FIG. 4A, the angle between adjacent sub lenses 131 refers to the angle between the first curved surfaces 141 of adjacent sub lenses 131, the angle between the first curved surfaces 141 of adjacent sub lenses 131 refers to the angle between first curved lines obtained by using a first plane (that is, the paper surface as illustrated in FIG. 3A) to cut the first curved surfaces 141 of adjacent sub lenses 131, the angle between the first curved lines of adjacent sub lenses 131 refers to the angle between tangent lines (for example, the tangent line 191 and 192) of the first curved lines of adjacent sub lenses 131 passing through the intersection 190 of the first curved lines of adjacent sub lenses 131. As illustrated in FIG. 3A, the overall thickness H11 of the curved lens 130 is the length of the orthographic projection of the curved lens 130 on the global axis of the curved lens 130 (for example, the axis 111 of the sub lens 131 in the first display channel 101 as illustrated in FIG. 3A). It should be noted that the deflection angle and the overall thickness of the curved lens 630 as illustrated in FIG. 4A are also defined in similar ways, which will not be repeated.

As illustrated in FIG. 3B, for the curved lens 130 with multi-pupil, the first curved line of the adjacent sub lenses 131 includes a portion of a first M-shape, the first M-shape includes two convex points (a convex point 194 and a convex point 195), the first M-shape (the first curved lines of the adjacent sub lenses 131) is entirely located on the same side of the line 193 connecting the two convex points, so it is roughly M-shaped. However, the embodiments of the present disclosure are not limited to the case as shown in the figure. As illustrated in FIG. 4B, for the curved lens 630 with single-pupil, the first curved line of adjacent sub lenses 131 is entirely located on the same side of the line 693 connecting the edge points of the first curved line of adjacent sub lenses 631.

As illustrated in FIG. 3B and FIG. 4B, the thickness H13 of the gap between adjacent sub lenses 131 of the curved lens with multi-pupil 130 is smaller than the thickness H63 of the gap between adjacent sub lenses 631 of the curved lens 630 with single pupil, thereby reducing the difficulty of integrally forming the curved lens. As illustrated in FIG. 3B, the thickness H13 of the gap between the adjacent sub lenses 131 of the curved lens 130 with multi-pupil is the distance between the intersection 190 of the first curved lines of the adjacent sub lenses 131 and the line 193 connecting the two convex points. As illustrated in FIG. 4B, the thickness H63 of the gap between adjacent sub lenses 631 of the curved lens 630 with single pupil is the distance between the intersection 690 of the first curved line of the adjacent sub lenses 631 and the line 693 connecting the edge points of the first curved line of the adjacent sub lenses 631.

Figure 5:
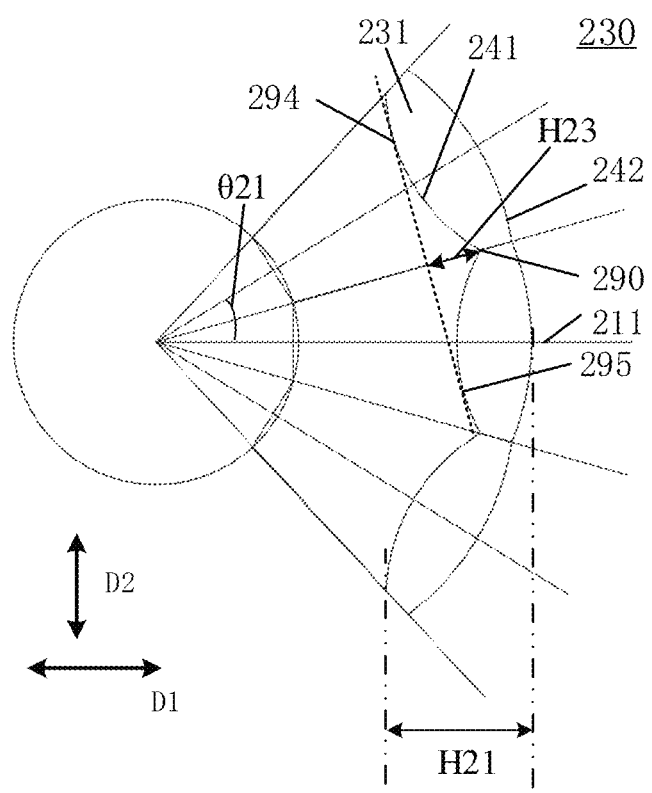
FIG. 5 is a diagram of another curved lens provided by at least one embodiment of the present disclosure.

FIG. 5 is a diagram of another curved lens provided by at least one embodiment of the present disclosure. For example, the curved lens 230 as illustrated in FIG. 5 can be used to form the display device 200.

The curved lens 230 as illustrated in FIG. 5 is similar to the curved lens illustrated in FIG. 3A and FIG. 3B. For the sake of clarity, only the differences between the two curved lenses will be described here, and the similarities will not be repeated. As illustrated in FIG. 5, the plurality of sub lenses 231 as illustrated in FIG. 5 does not have the edge regions of the plurality of sub lenses 131 of the curved lens 130 as illustrated in FIG. 3A and FIG. 3B; in this case, the deflection angle θ21 of the curved lens 230 as illustrated in FIG. 5 is smaller than the deflection angle θ11 of the curved lens illustrated in FIG. 3A and FIG. 3B; and the overall thickness H21 of the curved lens 230 as illustrated in FIG. 5 is less than the overall thickness H11 of the curved lens 130 as illustrated in FIG. 3A and FIG. 3B; the thickness H23 of the gap between the adjacent sub lenses 231 of the curved lens 230 as illustrated in FIG. 5 is smaller than the thickness H13 of the gap between the adjacent sub lenses 131 of the curved lens 130 as illustrated in FIG. 3A and FIG. 3B. That is, the curved lens 230 as illustrated in FIG. 5 can further reduce the deflection angle, the overall thickness, and the thickness of the gap between adjacent sub lenses of the curved lens, thereby further reducing the processing difficulty of the curved lens.

As illustrated in FIG. 5, the absolute value of the curvature radius of the second curved surface 242 is greater than the absolute value of the curvature radius of the first curved surface 241. For example, the ratio of the absolute value of the curvature radius of the second curved surface 242 to the absolute value of the curvature radius of the first curved surface 241 ranges from 3 to 7. For example, the absolute value of the curvature radius of the second curved surface 142 as illustrated in FIG. 3A and FIG. 3B may also be greater than the absolute value of the curvature radius of the first curved surface 141, which will not be repeated here.

In an example, as illustrated in FIG. 3A, FIG. 3B, and FIG. 5, the first curved surface 141 (or 241) and the second curved surface 142 (or 242) may be curved surfaces with rotational symmetry properties (relative to the axis of the sub lens). That is, the first curved surface 141 (or 241) and the second curved surface 142 (or 242) may be non-free curved surfaces. In this case, the axis 111 (or 211) of the plurality of sub lenses refers to the optical axis of the plurality of sub lenses. For example, each of the first curved surface 141 (or 241) and the second curved surface 142 (or 242) may adopt aspheric surfaces, spherical surfaces, or other suitable curved surface shapes.

Figure 7A:
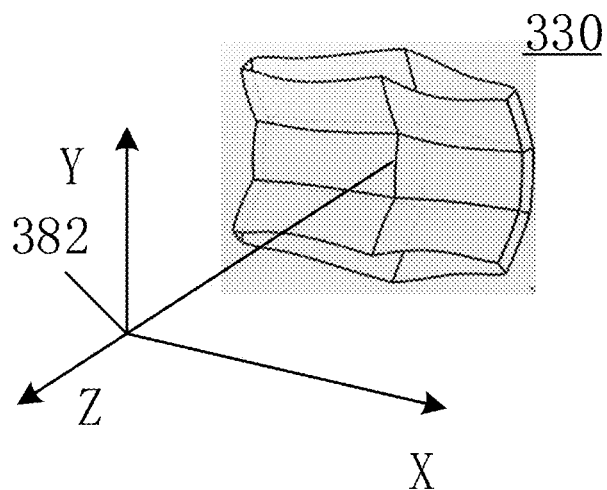
FIG. 7A is a diagram of further another curved lens provided by at least one embodiment of the present disclosure.

In another example, the first curved surface and the second curved surface may be curved surfaces without rotational symmetry properties (relative to the axis of the sub lens), that is, the first curved surface and the second curved surface may be free-form curved surfaces. For example, for the sake of clarity, an example in which the first curved surface and the second curved surface may be free-form curved surfaces will be described in the example as illustrated in FIG. 7A, which will not be repeated here.

In some examples, "the curved surface with rotational symmetry property" means that the entire curved surface (for example, the entire curved surface before being cut) including the curved surface has the rotational symmetry property, and the curved surface (for example, the curved surface is a part of the curved surface after being cut) in the curved lens is not required to have the rotational symmetry property in the strict sense; and the curved surface not having the rotational symmetry property means that the entire surface including the curved surface does not have the rotational symmetry property.

For example, the curved lens 130 (or 230) as illustrated in FIG. 3A, FIG. 3B, and FIG. 5 can be integrally formed (for example, integrated injection molding), so that there is no interface between adjacent sub lenses 131 and 231, that is, materials of the sub lenses 131 and 231 are continuously transitioned.

For example, the plurality of sub lenses 131 (lenses 231) of the curved lens 130 (or 230) as illustrated in FIG. 3A, FIG. 3B, and FIG. 5 are identical to each other, so as to reduce the manufacture cost of other optical components of the display device including the curved lens 130 (or 230).

For example, the number of (the count of) the plurality of sub lenses 131 (lenses 231) of the curved lens 130 (or 230) as illustrated in FIG. 3A, FIG. 3B, and FIG. 5 is an odd number. For example, the curved lens illustrated in FIG. 3A, FIG. 3B, and FIG. 5 may include a plurality of sub lenses that are the same even when the number of the plurality of sub lenses is not an even number, so as to improve the freedom degree of designing the curved lens and the display device including the curved lens. For example, the number of the plurality of sub lenses is three, so as to better balance the resolution and manufacture difficulty of the display device including the curved lens.

For example, the angles between adjacent first curved surfaces 241 (or 141) of the curved lens illustrated in FIG. 3A, FIG. 3B, and FIG. 5 are all greater than 120 degrees (for example, 140 degrees, 150 degrees, or 160 degrees) to reduce the thickness of the gap between the adjacent sub lenses 231 (or 131) and the overall thickness of the curved lens, so that the curved lens 230 (or 130) can be integrally formed (for example, integrated injection molding).

As illustrated in FIG. 2, FIG. 3A, FIG. 3B, and FIG. 5, the light incident surface is a convex curved surface on the whole, and the light exit surface is a concave curved surface on the whole. The meaning of the convex curved surface or the concave curved surface on the whole will be explained in the example as illustrated in FIG. 7A, which will not be repeated here.

For example, in the case where the curved lens 230 (or 130) as illustrated in FIG. 3A, FIG. 3B, and FIG. 5 is applied to the display device 100 as illustrated in FIG. 2, the plurality of display sub-images 161-163 of the display device 100 as illustrated in FIG. 2 are not limited to intersect each other, the plurality of display sub-images 161-163 may also be located on the same curved surface or on the same plane, in this case, it is difficult for the user to perceive that the plurality of display sub-images 161-163 are originated from different display screens.

Figure 6A:
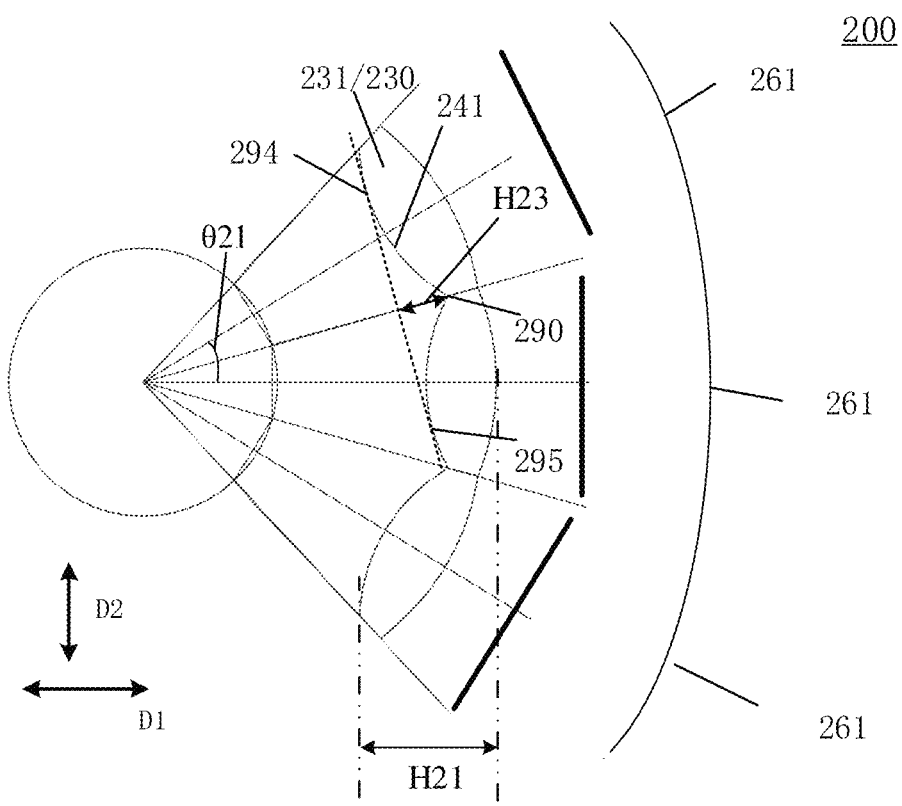
FIG. 6A is a cross-sectional diagram of a display device including the curved lens in FIG. 5.

In one example, as illustrated in FIG. 6A, the plurality of display sub-images 261 are located on the same curved surface (for example, the same spherical surface), that is, the imaging surfaces of the plurality of display channels are located on the same curved surface. In this case, each display sub-image 261 is a curved image. For example, when designing a curved lens (for example, using the optical design software ZEMAX to design a curved lens), the curved lens can be optimized by making the imaging surfaces of the plurality of display channels be all curved surfaces, and the curvature radii of the imaging surfaces of the plurality of display channels be the same, so that the plurality of display sub-images 261 are located on the same curved surface.

Figure 6B:
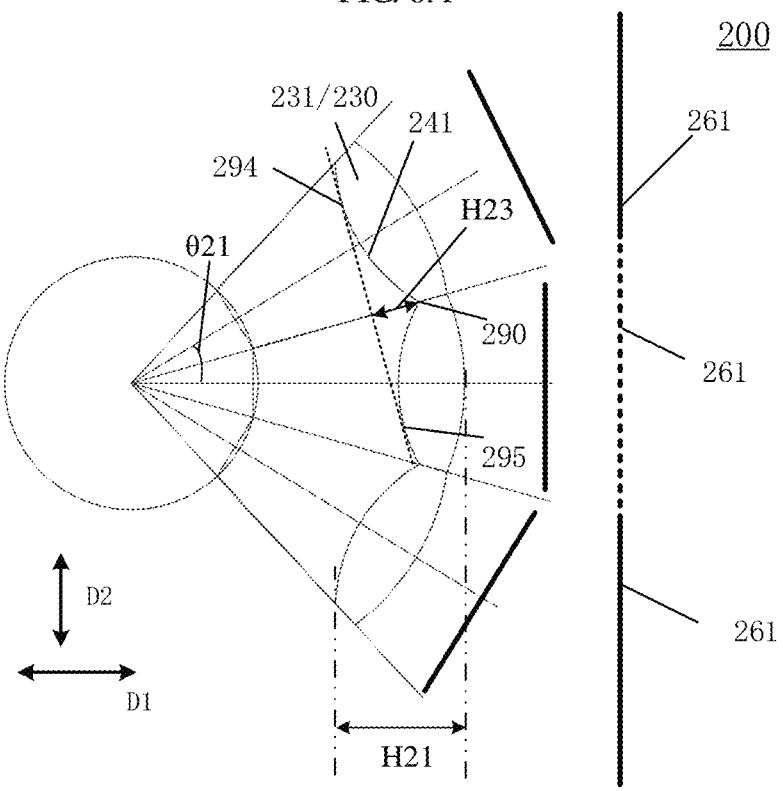
FIG. 6B is another cross-sectional diagram of a display device including the curved lens in FIG. 5.

In another example, as illustrated in FIG. 6B, the plurality of display sub-images 261 are located on the same plane, that is, the imaging surfaces of the plurality of display channels are on the same plane. In this case, each display sub-image 261 is a plane image. For example, when designing a curved lens, the curved lens can be optimized by making the imaging surfaces of the plurality of display channels be plane surfaces and perpendicular to the global axis of the curved lens, so that the plurality of display sub-images 261 are on the same plane.

At least one embodiment of the present disclosure provides another curved lens, which comprises a plurality of sub lenses around an optical center of the curved lens and connected with each other; each of the plurality of sub lenses includes a first curved surface and a second curved surface opposite to each other; a plurality of the first curved surfaces are connected with each other to form a light exit surface of the curved lens, and a plurality of the second curved surfaces are connected with each other to form a light incident surface of the curved lens. The light exit surface is closer to the optical center of the curved lens compared with the light incident surface; the light incident surface is a convex surface on the whole, and the light exit surface is a concave surface on the whole; and pupils of the plurality of sub lenses are located at different positions and around the optical center of the curved lens.

Figure 7B:
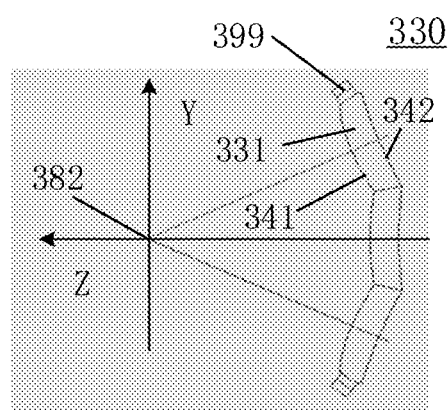
FIG. 7B is a cross-sectional diagram obtained by sectioning the curved lens in FIG. 7A by a first plane.
Figure 7C:
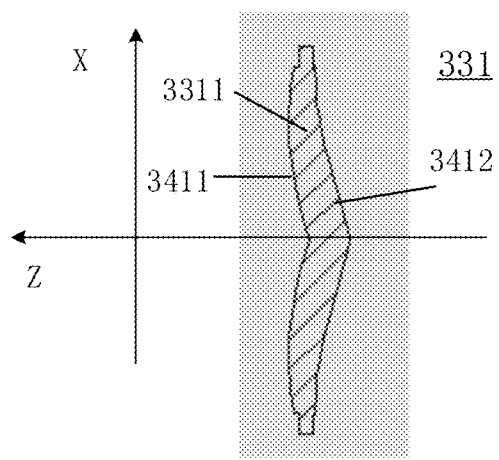
FIG. 7C is a cross-sectional diagram obtained by sectioning the curved lens in FIG. 7A by a second plane.
Figure 8A:
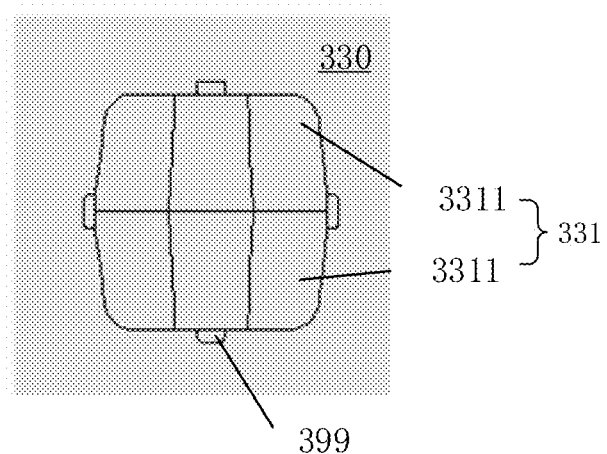
FIG. 8A is an orthographic projection of the curved lens illustrated in FIG. 7A on the XOY plane.
Figure 8B:
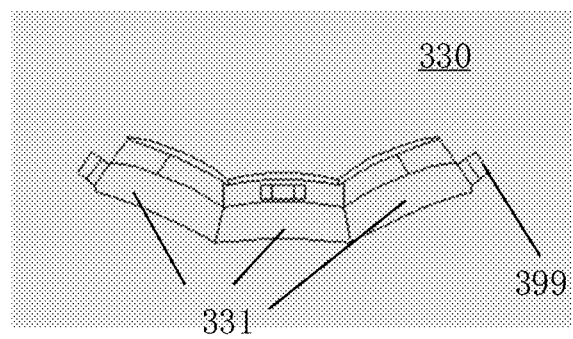
FIG. 8B is an orthographic projection of the curved lens illustrated in FIG. 7A on the YOZ plane.
Figure 8C:
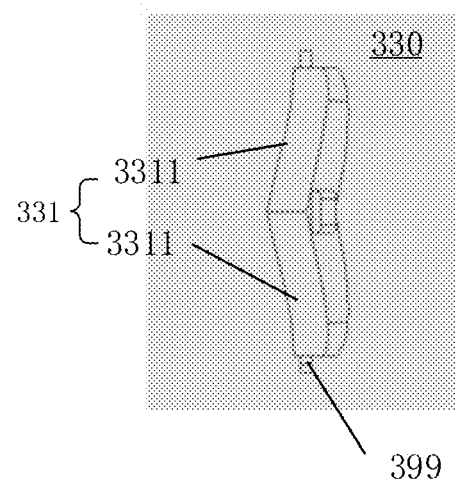
FIG. 8C is an orthographic projection of the curved lens illustrated in FIG. 7A on the XOZ plane.

FIG. 7A is a diagram of further another curved lens 330 provided by at least one embodiment of the present disclosure; FIG. 7B is a cross-sectional diagram obtained by sectioning the curved lens 330 by a first plane (that is, the YOZ plane in FIG. 7A); FIG. 7C is a cross-sectional diagram obtained by sectioning the curved lens 330 by a second plane (that is, the XOZ plane in FIG. 7A). FIG. 8A is an orthographic projection of the curved lens 330 as illustrated in FIG. 7A on the XOY plane; FIG. 8B is an orthographic projection of the curved lens 330 as illustrated in FIG. 7A on the YOZ plane; and FIG. 8C is an orthographic projection of the curved lens 330 as illustrated in FIG. 7A on the XOZ plane. For example, the X, Y, and Z axes in the coordinate system as illustrated in FIG. 7A intersect at the coordinate origin O (the coordinate origin O is not marked in FIG. 7A). For example, the coordinate origin O coincides with the optical center 382 of the curved lens 330.

It should be noted that, for clarity, FIG. 7A does not show the mounting portion 399 of the curved lens 330, however, FIGS. 7B-7C and FIGS. 8A-8C show the mounting portion 399 of the curved lens 330.

As illustrated in FIG. 7A, FIG. 7B, FIG. 8A and FIG. 8B, the curved lens 330 includes three sub lenses 331 arranged around (for example, partially around) the optical center 382 of the curved lens 330 and connected with each other. Each of the sub lenses 331 includes a first curved surface 341 and a second curved surface 342 opposite to each other. For example, the first curved surface 341 and the second curved surface 342 are opposite to each other in the extending direction of the axis 311 of a corresponding sub lens 331. For example, as illustrated in FIG. 7A, FIG. 7B, FIG. 8A, and FIG. 8B, the optical center 382 of the curved lens 330 is the intersection of the axes 311 of the plurality of sub lenses 331.

For example, the plurality of sub lenses 331 are identical to each other to reduce the manufacture cost of other optical components of the display device 300 including the curved lens 330.

There are three points to explain.

(1) The plurality of sub lenses 331 are identical to each other means that the curved shape of the first curved surface 341 is the same as the curved shape of the second curved surface 342, and a portion of one of the plurality of sub lenses 331 corresponding to the view field of the sub lens 331 can be used to form a portion of another one of the plurality of sub lenses 331 corresponding to the view field of the sub lens 331 through decentering and deflection (for example, rotating around the center of a corresponding curved surface). For example, in the case where none of the plurality of sub lenses 331 has a portion corresponding to the outside of the view field, the plurality of sub lenses 331 are completely the same, that is, one of the plurality of sub lenses 331 can be used to form another one of the plurality of sub lenses 331 through decentering and deflection.

(2) According to actual application requirements, the plurality of sub lenses 331 may also be set to be different to further improve the display quality and reduce the manufacturing difficulty of the curved lens 330 and other optical components in the display device including the curved lens 330.

(3) The number of the plurality of sub lenses 331 is not limited to three. According to actual application requirements, the number of the plurality of sub lenses 331 may also be equal to five or other applicable odd numbers; in this case, because the curved lens 330 as illustrated in FIG. 7 may also include a plurality of the sub lenses 331 that are identical, even when the number of the plurality of sub lenses 331 is not an even number, the freedom degree of designing the curved lens 330 and the display device including the curved lens 330 can be improved. For example, the number of the plurality of sub lenses 331 may also be set to an even number.

As illustrated in FIG. 7A, the plurality of first curved surfaces 341 are connected with each other to form the light exit surface of the curved lens 330 (the curved surface on the left in FIG. 7A), and the plurality of second curved surfaces 342 are connected with each other to form the light incident surface of the curved lens 330 (the curved surface on the right side in FIG. 7A). Compared with the light incident surface, the light exit surface is closer to the optical center 382 of the curved lens 330. As illustrated in FIG. 7A, the optical center 382 is the origin of the XYZ-coordinate system.

As illustrated in FIG. 7A, the light incident surface is a convex curved surface on the whole, and the light exit surface is a concave curved surface on the whole. It should be noted that the light incident surface being the convex curved surface on the whole means that when viewed from the side of the light incident surface away from the optical center 382 of the curved lens 330, the intersection point of the light incident surface and the global axis of the curved lens 330 (for example, the Z axis in FIG. 7A) is closer to the observer than the edge of the curved lens 330 (the intersection line of the maximum effective view field of the curved lens 330 and the curved lens 330, for example, an annular intersection line). The light exit surface being the concave surface on the whole means that when viewed from the side of the light exit surface closer to the optical center 382 of the curved lens 330, the intersection point of the light exit surface and the global axis 310 of the curved lens 330 (for example, the Z axis in FIG. 7A) is away from the observer than the edge of the curved lens 330 (the intersection line of the maximum effective view field of the curved lens 330 and an curved lens 330). For example, in other examples of the present disclosure (for example, FIG. 3A and FIG. 5), "the convex or concave curved surface on the whole" has a similar definition, which will not be repeated.

As illustrated in FIG. 7A, FIG. 7C, FIG. 8A, and FIG. 8C, each of the plurality of sub lenses 331 includes two sub-sub lenses 3311 arranged around the optical center 382 and connected with each other; each sub-sub lens 3311 includes a first sub curved surface 3411 and a second sub curved surface 3421 opposite to each other; the first sub curved surface 3411 is a first free-form curved surface, and the second sub curved surface 3421 is a second free-form curved surface. For example, the curved shape of the first free-form curved surface is different from the curved shape of the second free-form curved surface. A plurality of first sub curved surfaces 3411 are connected with each other to form a first curved surface 341, and a plurality of second sub curved surfaces 3421 are connected with each other to form a second curved surface 342. For example, the two sub-sub lenses 3311 are symmetrically distributed with respect to the first plane (that is, the YOZ plane in FIG. 7A).

It should be noted that the number of sub-sub lenses 3311 in each sub lens 331 is not limited to two. According to the actual application requirements, the number of sub-sub lenses 3311 in each sub lens 331 may be set to be three or other applicable numbers.

For example, the curved lens 330 as illustrated in FIG. 7A may be formed by an integrated manufacture process (for example, integrated injection molding), so that there is no interface between adjacent sub lenses 331.

At least one embodiment of the present disclosure further provides a display device 300, which includes the curved lens 330 as illustrated in FIG. 7A. For example, the curved lens 330 may be installed in the display device 300 via the mounting portion 399 of the curved lens 330. It should be noted that the shape and installation position of the mounting portion 399 of the curved lens 330 as illustrated in FIG. 8A are only an example. According to actual application requirements, the mounting portion 399 of the curved lens 330 may also adopt other shapes and setting positions.

Figure 9B:
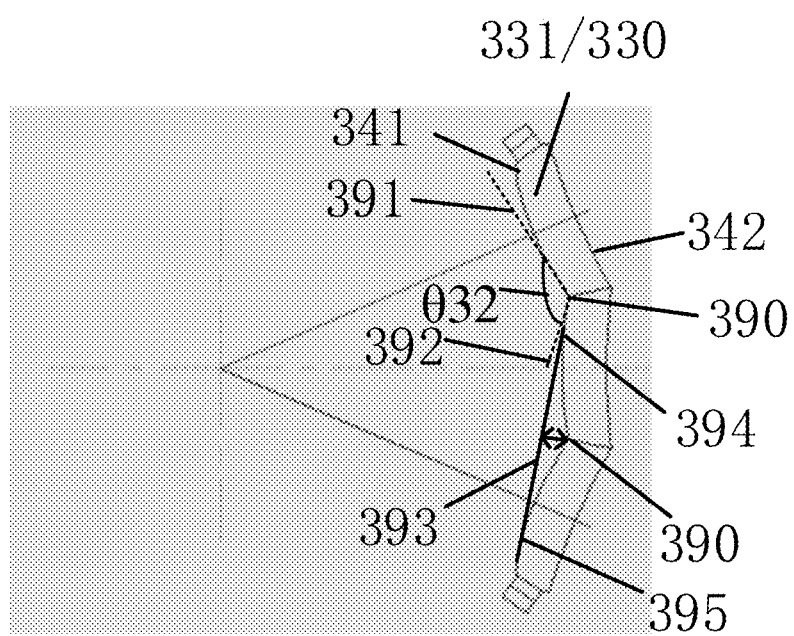
FIG. 9B is another cross-sectional diagram obtained by sectioning a display device including the curved lens illustrated in FIG. 7A by the first plane.
Figure 10A:
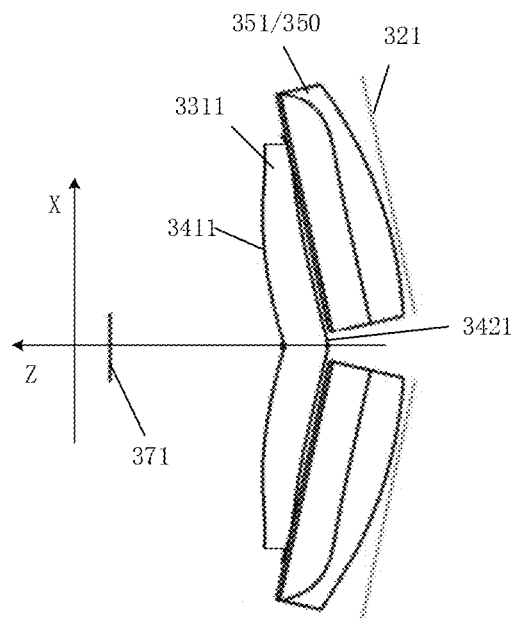
FIG. 10A is a cross-sectional diagram obtained by sectioning a display device including the curved lens illustrated in FIG. 7A by the second plane.
Figure 10B:
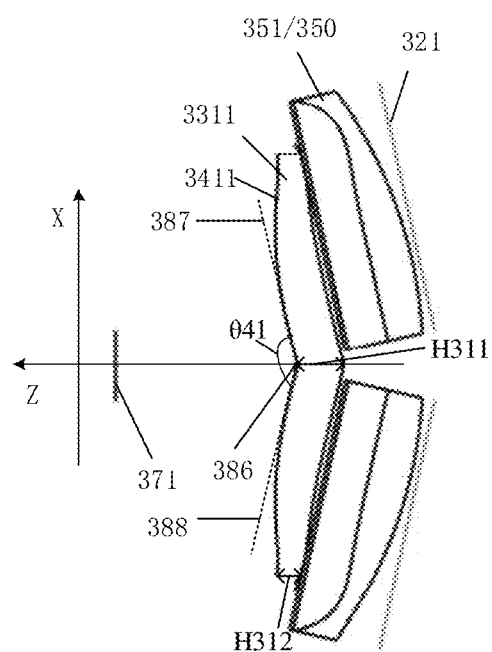
FIG. 10B is another cross-sectional diagram obtained by sectioning a display device including the curved lens illustrated in FIG. 7A by the second plane.
Figure 10C:
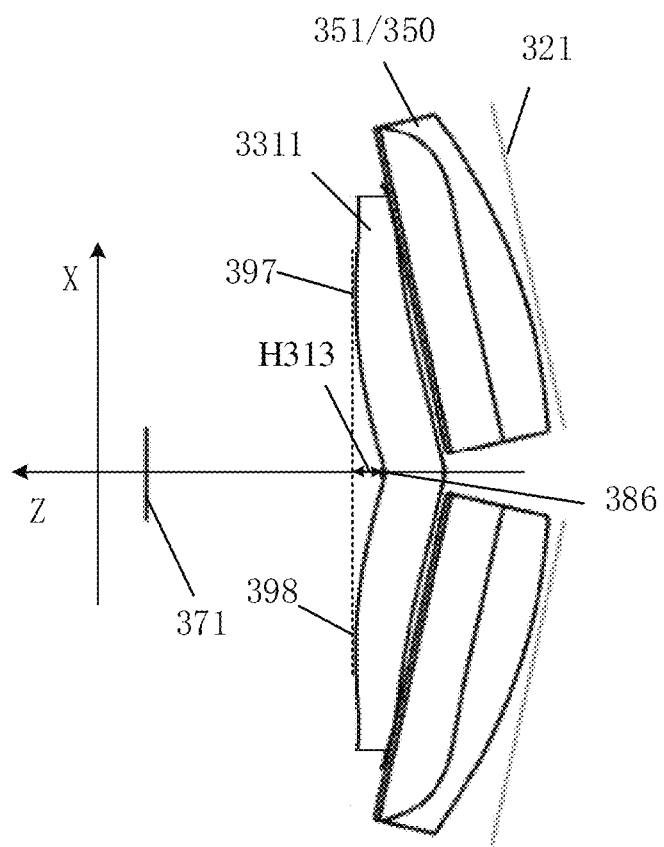
FIG. 10C is further another cross-sectional diagram obtained by sectioning a display device including the curved lens illustrated in FIG. 7A by the second plane.

FIG. 9A is a cross-sectional diagram obtained by sectioning a display device 300 including the curved lens 330 as illustrated in FIG. 7A by the first plane (that is, the YOZ plane); FIG. 9B is another cross-sectional diagram obtained by sectioning a display device 300 including the curved lens 330 as illustrated in FIG. 7A by the first plane; FIG. 10A is a cross-sectional diagram obtained by sectioning a display device 300 including the curved lens 330 as illustrated in FIG. 7A by the second plane (that is, the XOZ plane); FIG. 10B is another cross-sectional diagram obtained by sectioning a display device 300 including the curved lens 330 as illustrated in FIG. 7A by the second plane; and FIG. 10C is further another cross-sectional diagram obtained by sectioning a display device 300 including the curved lens 330 as illustrated in FIG. 7A by the second plane. It should be noted that, for the sake of clarity, FIG. 9A and FIG. 9B do not show other optical components between the curved lens 330 and the display screen 321; however, FIGS. 10A-10C show an example of other optical components between the curved lens 330 and the display screen 321.

As illustrated in FIG. 9A, the display device 300 further includes a plurality of display channels 301; the plurality of sub lenses 331 of the curved lens 330 are in one-to-one correspondence with the plurality of display channels 301; each of the plurality of sub lenses 331 is arranged (for example, completely located) in a corresponding display channel 301. As illustrated in FIG. 9A, imaging surfaces of the plurality of display channels 301 are located on the same plane, thereby further improving the display quality of the display device 300.

For example, each display sub-image 361 is a plane image, and the imaging surfaces of the plurality of display channels 301 are all plane surfaces and are all perpendicular to the global axis 310 of the curved lens 330 (for example, the axis 311 of the sub lens 331 in the middle display channel 301 as illustrated in FIG. 9A, that is, the Z axis). It should be noted that the imaging surfaces of the plurality of display channels 301 of the display device 300 as illustrated in FIG. 9A are not limited to being located on the same plane. According to actual application requirements, the imaging surfaces of the plurality of display channels 301 of the display device 300 as illustrated in FIG. 9A may also be located on the same curved surface or intersect each other; the specific implementation manners may refer to the examples illustrated in FIG. 6A and FIG. 2 respectively, which will not be repeated here.

As illustrated in FIG. 9A, pupils 371 of the plurality of sub lenses 331 are located at different positions, and are arranged around (for example, partially around) the optical center 382 of the curved lens 330. For example, arranging the pupils 371 of the plurality of sub lenses 331 around the optical center 382 of the curved lens 330 can have the following two technical effects: first, the pupil of the user can better receive the output light, for forming the display sub-image 361, of the display device 300, thereby improving the display effect of the display device 300; secondly, the angle (or deflection angle) between adjacent sub lenses 331 can be reduced, thereby reducing the thickness of the curved lens 330 and making the curved lens 330 be integrally formed (for example, integrated injection molding).

As illustrated in FIG. 9A, the optical center 382 of the curved lens 330 is located on the side of the pupils 371 of the plurality of sub lenses 331 away from the curved lens 330.

It should be noted that, in some examples, the display device 300 as illustrated in FIG. 9A may adopt a curved lens with single pupil, and the curved lens 330 as illustrated in FIG. 7A may also be designed such that the pupils 371 of the plurality of sub lenses 331 are located at the same position.

For example, the pupils 371 of the plurality of sub lenses 331 may be located at different positions on the surface of the user's eyeball. For example, the center of the user's eyeball may be approximately located at the optical center 382 of the curved lens 330. For example, the axis 311 of each of the plurality of sub lenses 331 refers to a virtual straight line perpendicular to the plane where the pupil 371 of each of the sub lenses 331 are located and passing through the optical center 382 of the curved lens 330.

For example, as illustrated in FIG. 9B, the angle θ32 between adjacent first curved surfaces 341 of the curved lens 330 is greater than 120 degrees (for example, 140 degrees, 150 degrees, or 160 degrees) to reduce the thickness of the gap between adjacent sub lenses 331 and the overall thickness of the curved lens 330, so that the curved lens 330 can be integrally formed (for example, integrated injection molding).

In some examples, as illustrated in FIG. 9B, the angle θ32 between the first curved surfaces 341 of adjacent sub lenses 331 refers to the angle between first curved lines obtained by using the first plane (that is, the YOZ plane in FIG. 7A) to cut the first curved surfaces 341 of adjacent sub lenses 331; the angle θ32 between the first curved lines of adjacent sub lenses 331 refers to the angle between tangent lines (for example, the tangent line 391 and the tangent line 392) of the first curved lines of adjacent sub lenses 331 passing through the intersection point 390 of the first curved lines of the adjacent sub lenses 331. As illustrated in FIG. 9B, the overall thickness of the curved lens 330 is the length of the orthographic projection of the curved lens 330 on the global axis 310 of the curved lens 330 (for example, the axis 311 of the sub lens 331 in the middle display channel 301 as illustrated in FIG. 9A, that is, the Z axis).

As illustrated in FIG. 9B, the first curved line of adjacent sub lenses 331 includes a portion of a first M-shape, the first M-shape includes two first convex points (a first convex point 394 and a first convex point 395). The M-shape (the first curved line of the adjacent sub lenses 331) is entirely located on the same side of the line 393 connecting the two first convex points, so it is roughly M-shape. As illustrated in FIG. 9B, the thickness of the gap between the adjacent sub lenses 331 of the curved lens 330 is the distance between the intersection 390 of the first curved lines of the adjacent sub lenses 331 and the line 394 connecting the two first convex points. As illustrated in FIG. 9B, the second curved lines obtained by sectioning two adjacent second curved surfaces 342 by the first plane includes a ridge-shaped portion.

For example, as illustrated in FIGS. 10A-10C, each display screen 321 may include two sub screens, and the two sub screens respectively correspond to two sub-sub lenses 3311. For example, the two sub screens included in each display screen 321 are spaced apart from each other and can be independently controlled.

For example, as illustrated in FIGS. 10A-10C, a cemented lens 351 may be arranged between each display sub screen and a corresponding sub-sub lens 3311, and a plurality of cemented lenses 351 corresponding to the plurality of sub-sub lenses 3311 surround (e.g., partially surround) the optical center 382 of the curved lens 330 and may be combined with each other to form a lens group 350 that is stacked with the curved lens 330. For example, the surface of each of the plurality of cemented lenses 351 closer to the display sub screen may be provided with a partially reflective and partially transmissive film (semi-reflective semi-transmissive film); the surface of each of the plurality of cemented lenses 351 closer to the curved lens may be provided with a reflective polarizing plate or a reflective polarizing film, which will not be repeated here.

Figure 10D:
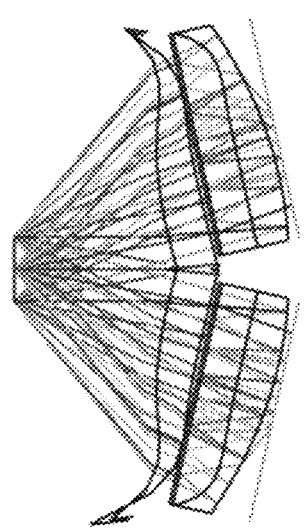
FIG. 10D is a diagram of a simulation result of an optical path of a display device including the curved lens illustrated in FIG. 7A.

FIG. 10D is a diagram of a simulation result of an optical path of a display device 300 including the curved lens 330 as illustrated in FIG. 7A. It should be noted that, the curved lens 330 as illustrated in FIG. 10D further includes a portion outside the view field of the curved lens 330 and the display device 300. Therefore, the shape of the curved lens illustrated in FIG. 10D is not completely the same as the shape of the curved lens illustrated in FIG. 10C. For example, when the curved lens 330 is integrally formed, the mold used to form the curved lens does not include a portion corresponding to the portion outside the view field of the curved lens 330. Therefore, the final product of the curved lens does not include the portion outside the view field of the curved lens 330. As illustrated in FIGS. 10A-10D, pupils 371 of the two sub-sub lenses 3311 are located at the same position, but the embodiments of the present disclosure are not limited to this; according to actual application requirements, the pupils 371 of the two sub-sub lenses 3311 may also be located at different positions and around (for example, partially around) the center of the curved lens 330.

As illustrated in FIG. 10B, the angle θ41 between two adjacent first sub curved surfaces 3411 is greater than 120 degrees (for example, greater than 130 degrees, greater than 140 degrees, greater than 150 degrees, or greater than 160 degrees). In some examples, the angle between the first sub curved surfaces 3411 of adjacent sub-sub lenses 3311 refers to the angle between the second curved lines obtained by using the second plane (that is, the XOZ plane in FIG. 7A) to cut the first sub curved surfaces 3411 of the adjacent sub-sub lenses 3311; and the angle between the second curved lines of adjacent sub-sub lenses 3311 refers to the angle between tangent lines (for example, the tangent line 387 and the tangent line 388) of the second curved lines of the adjacent sub-sub lenses 3311 passing through the intersection 386 of the second curved lines of the adjacent sub-sub lenses 3311.

As illustrated in FIG. 10B, the center thickness H311 of each of the plurality of sub lenses 331 is greater than 2.5 mm (for example, 3 mm, 3.5 mm, or 4 mm); the edge thickness H312 of each of the plurality of sub lenses 331 is greater than 1.2 mm (for example, 1.5 mm, 1.8 mm, or 2 mm); and the ratio of the center thickness to the edge thickness of each of the plurality of sub lenses 331 ranges from 1.8 to 3 (for example, 2, 2.2, 2.5, 2.7, or 2.9).

In some examples, the central thickness H311 of the sub lens 331 refers to the length of the line segment, which is intersected with and passes through the sub lens 331, of a virtual straight line (for example, the Z axis in FIG. 10B), in which the virtual straight line (for example, the Z axis in FIG. 10B) is in the view field of the sub lens 331, and at the position where the angle of view field is zero (the position where the zero view field of the sub lens 331 is located); and the edge thickness H312 of the sub lens 331 is the length of the intersection line of the sub lens 331 and the virtual straight line parallel to the virtual straight line where the zero view field of the sub lens 331 is located and passing through the position where the maximum view field of the sub lens 331 is located (that is, the intersection point of the maximum view field of the sub lens 331 and the light exit surface). For example, in some other examples of the present disclosure, the center thickness and the edge thickness of the sub lens also meet the above definition, which will not be repeated.

As illustrated in FIG. 10C, the second curved lines obtained by sectioning two adjacent first sub curved surfaces 3411 by the second plane (that is, the XOZ plane in FIG. 7A) includes a portion of a second M-shape; the portion of the second M-shape includes two second convex points (second convex points 397 and 398), and the second curved lines are located on the same side of the line connecting the two second convex points. As illustrated in FIG. 10C, the curved line obtained by sectioning two adjacent second sub curved surfaces 3421 by the second plane (that is, the XOZ plane FIG. 7A) includes a ridge-shaped portion.

For example, the thickness of the gap between adjacent sub-sub lenses 331 is H313.

For example, the curved surface shapes of the first sub curved surface 3411 and the second sub curved surface 3421 can be represented by XY polynomials.

For example, the surface shape z1 (x, y) of each of the plurality of first sub curved surfaces 3411 and the surface shape z2 (x, y) of each of the plurality of second sub curved surfaces 3421 respectively satisfy the following expressions (1) and (2):

$$z1(x, y) = \frac{c1y^2}{1 + \sqrt{1 - (1+k1)\,c1^2y^2}} + \sum_{m=0}^{p}\sum_{n=0}^{p} Cmn1 \times x^m y^n, \quad (1)$$

$$z2(x, y) = \frac{c2y^2}{1 + \sqrt{1 - (1+k2)\,c2^2y^2}} + \sum_{m=0}^{p}\sum_{n=0}^{p} Cmn2 \times x^m y^n. \quad (2)$$

Here, c1 is the curvature radius of each of the plurality of first sub curved surfaces 3411; k1 is the quadric surface constant (conic constant) of each of the plurality of first sub curved surfaces 3411; Cmn1 is the coefficient of the (m−n)th order of each of the plurality of first sub curved surfaces 3411; c2 is the curvature radius of each of the plurality of second sub curved surfaces 3421; k2 is the quadric surface constant (conic constant) of each of the plurality of second sub curved surfaces 3421; Cmn2 is the coefficient of the (m−n)th order of each of the plurality of second sub curved surfaces 3421; and m+n is greater than or equal to 1 and less than or equal to P.

For example, the absolute value of c2 is greater than the absolute value of c1. For example, the ratio of the absolute value of c2 to the absolute value of c1 ranges from 3 to 7 (for example, 4, 5, or 6).

For example, in the case where the first curved surface 341 includes two first sub curved surfaces 3411 and the second curved surface 342 includes two second sub curved surfaces 3421, the curvature radii of the two first sub curved surfaces 3411 are the same, and the quadric surface constants of the two first sub curved surfaces 3411 are the same; and the curvature radii of the two second sub curved surfaces 3421 are the same, and the quadric surface constants of the two second sub curved surfaces 3421 are the same.

For example, the first curved surface 341 includes a first sub-sub curved surface located on the lower side of FIG. 10A and a second sub-sub curved surface located on the upper side of FIG. 10A; and the second curved surface 342 includes a third sub-sub curved surface located on the lower side of FIG. 10A, and a fourth sub-sub curved surface on the upper side of FIG. 10A; the surface shape z1_1 (x, y) of the first sub-sub curved surface, the surface shape z1_2 (x, y) of the second sub-sub curved surface, the surface shape z2_1 (x, y) of the third sub-sub curved surface, and the surface shape z2_2 (x, y) of the fourth sub-sub curved surface respectively satisfy the following expressions (3)-(6), in which, Cmn1 of the first sub-sub curved surface and Cmn1 of the second sub-sub curved surface are respectively equal to Cmn1_1 and Cmn1_2; Cmn2 of the third sub-sub curved surface and Cmn4 of the fourth sub-sub curved surface are respectively equal to Cmn2_1 and Cmn2_2.

$$z1\_1(x, y) = \frac{c1y^2}{1 + \sqrt{1 - (1 + k1)c1^2y^2}} + \sum_{m=0}^{p}\sum_{n=0}^{p} Cmn1\_1 \times x^m y^n, \quad (3)$$

$$z1\_2(x, y) = \frac{c1y^2}{1 + \sqrt{1 - (1 + k1)c1^2y^2}} + \sum_{m=0}^{p}\sum_{n=0}^{p} Cmn1\_2 \times x^m y^n, \quad (4)$$

$$z2\_1(x, y) = \frac{c2y^2}{1 + \sqrt{1 - (1 + k2)c2^2y^2}} + \sum_{m=0}^{p}\sum_{n=0}^{p} Cmn2\_1 \times x^m y^n, \quad (5)$$

$$z2\_2(x, y) = \frac{c2y^2}{1 + \sqrt{1 - (1 + k2)c2^2y^2}} + \sum_{m=0}^{p}\sum_{n=0}^{p} Cmn2\_2 \times x^m y^n. \quad (6)$$

For example, when the value of m is an odd number, the values of Cmn1 and Cmn2 are both zero, so that the sub-sub lenses 3311 can be symmetrically distributed with respect to the first plane (that is, the YOZ plane in FIG. 7A).

For example, when the value of m+n is an odd number, the sum of the coefficients of the (m−n)th order of the plurality of first sub-sub curved surfaces 3411 is equal to zero (for example, the sum of Cmn1_1 and Cmn1_2 is equal to zero); and the sum of the coefficients of the (m−n)th order of the plurality of second sub-sub curved surfaces 3421 is equal to zero (for example, the sum of Cmn2_1 and Cmn2_2 is equal to zero), so that two adjacent sub-sub lenses 3311 can be spliced with each other.

In an example, the values of Cmn1_1 and Cmn1_2 and the values of Cmn2_1 and Cmn2_2 are shown in Table 1 and Table 2, respectively.

TABLE 1

| Cmn1_1 | Cmn1_2 |
|---|---|
| m = 0, n = 1: 5.226872 | m = 0, n = 1: −5.226872 |
| m = 2, n = 0: 2.3683177 | m = 2, n = 0: 2.3683177 |
| m = 0, n = 2: 7.2707216 | m = 0, n = 2: 7.2707216 |
| m = 2, n = 1: −0.13076123 | m = 2, n = 1: 0.13076123 |
| m = 0, n = 3: 3.5493103 | m = 0, n = 3: −3.5493103 |
| m = 4, n = 0: 0.37003974 | m = 4, n = 0: 0.37003974 |
| m = 2, n = 2: 0.24139937 | m = 2, n = 2: 0.24139937 |
| m = 0, n = 4: 1.3298504 | m = 0, n = 4: 1.3298504 |
| m = 4, n = 1: 0.91543522 | m = 4, n = 1: −0.91543522 |
| m = 2, n = 3: 0.23909709 | m = 2, n = 3: −0.23909709 |
| m = 0, n = 5: 0.30600293 | m = 0, n = 5: −0.30600293 |
| m = 6, n = 0: 0.38812337 | m = 6, n = 0: 0.38812337 |
| m = 4, n = 2: 0.64560608 | m = 4, n = 2: 0.64560608 |
| m = 2, n = 4: 0.067475608 | m = 2, n = 4: 0.067475608 |
| m = 0, n = 6: 0.040674688 | m = 0, n = 6: 0.040674688 |
| m = 6, n = 1: 0.34054159 | m = 6, n = 1: −0.34054159 |
| m = 4, n = 3: 0.18693421 | m = 4, n = 3: −0.18693421 |
| m = 2, n = 5: 0.007150644 | m = 2, n = 5: −0.0071506442 |
| m = 0, n = 7: 0.00271526 | m = 0, n = 7: −0.0027152603 |
| m = 8, n = 0: 0.006099753 | m = 8, n = 0: 0.0060997526 |
| m = 6, n = 2: 0.092716324 | m = 6, n = 2: 0.092716324 |
| m = 4, n = 4: 0.023069232 | m = 4, n = 4: 0.023069232 |
| m = 2, n = 6: 0.000185491 | m = 2, n = 6: 0.0001854912 |
| m = 0, n = 8: 5.99344e−05 | m = 0, n = 8: 5.9934422e−05 |
| m = 8, n = 1: 0.001486721 | m = 8, n = 1: −0.0014867211 |
| m = 6, n = 3: 0.008087659 | m = 6, n = 3: −0.0080876588 |
| m = 4, n = 5: 0.000963054 | m = 4, n = 5: −0.00096305378 |

TABLE 2

| Cmn2_1 | Cmn2_2 |
|---|---|
| m = 0, n = 1: 3.3948842 | m = 0, n = 1: −3.3948842 |
| m = 2, n = 0: −0.41704482 | m = 2, n = 0: −0.41704482 |
| m = 0, n = 2: 5.1070433 | m = 0, n = 2: 5.1070433 |
| m = 2, n = 1: −1.3349282 | m = 2, n = 1: 1.3349282 |
| m = 0, n = 3: 4.2274449 | m = 0, n = 3: −4.2274449 |
| m = 4, n = 0: 0.16889143 | m = 4, n = 0: 0.16889143 |
| m = 2, n = 2: −0.53017686 | m = 2, n = 2: −0.53017686 |
| m = 0, n = 4: 2.0561566 | m = 0, n = 4: 2.0561566 |
| m = 4, n = 1: 0.41393656 | m = 4, n = 1: −0.41393656 |
| m = 2, n = 3: −0.05432783 | m = 2, n = 3: 0.05432783 |
| m = 0, n = 5: 0.58605319 | m = 0, n = 5: −0.58605319 |
| m = 6, n = 0: 0.31023519 | m = 6, n = 0: 0.31023519 |
| m = 4, n = 2: 0.26196894 | m = 4, n = 2: 0.26196894 |
| m = 2, n = 4: 0.005799915 | m = 2, n = 4: 0.0057999148 |
| m = 0, n = 6: 0.095577293 | m = 0, n = 6: 0.095577293 |
| m = 6, n = 1: 0.25433855 | m = 6, n = 1: −0.25433855 |
| m = 4, n = 3: 0.046292184 | m = 4, n = 3: −0.046292184 |
| m = 2, n = 5: −0.000825933 | m = 2, n = 5: 0.00082593302 |
| m = 0, n = 7: 0.00797778 | m = 0, n = 7: −0.0079777803 |
| m = 8, n = 0: 0.000243206 | m = 8, n = 0: 0.00024320633 |
| m = 6, n = 2: 0.064366742 | m = 6, n = 2: 0.064366742 |
| m = 4, n = 4: −0.001273274 | m = 4, n = 4: −0.0012732741 |
| m = 2, n = 6: −0.000323851 | m = 2, n = 6: −0.00032385128 |
| m = 0, n = 8: 0.000251122 | m = 0, n = 8: 0.00025112212 |
| m = 8, n = 1: 0.000205228 | m = 8, n = 1: −0.00020522791 |
| m = 6, n = 3: 0.005264855 | m = 6, n = 3: −0.0052648552 |
| m = 4, n = 5: −0.000606115 | m = 4, n = 5: 0.00060611458 |

In another example, the values of Cmn1_1 and Cmn1_2 and the values of Cmn2_1 and Cmn2_2 are shown in Table 3 and Table 4, respectively.

TABLE 3

| Cmn1_1 | Cmn1_2 |
|---|---|
| m = 0, n = 1: 4.226872 | m = 0, n = 1: −4.226872 |
| m = 2, n = 0: 2.3683177 | m = 2, n = 0: 2.3683177 |
| m = 0, n = 2: 6.2731217 | m = 0, n = 2: 6.2731217 |
| m = 2, n = 1: −0.13076123 | m = 2, n = 1: 0.13076123 |
| m = 0, n = 3: 4.7993221 | m = 0, n = 3: −4.7993221 |
| m = 4, n = 0: 0.37003974 | m = 4, n = 0: 0.37003974 |
| m = 2, n = 2: 0.24139937 | m = 2, n = 2: 0.24139937 |
| m = 0, n = 4: 1.3298504 | m = 0, n = 4: 1.3298504 |
| m = 4, n = 1: 0.91543522 | m = 4, n = 1: −0.91543522 |
| m = 2, n = 3: 0.23909709 | m = 2, n = 3: −0.23909709 |
| m = 0, n = 5: 0.30600293 | m = 0, n = 5: −0.30600293 |
| m = 6, n = 0: 0.38812337 | m = 6, n = 0: 0.38812337 |
| m = 4, n = 2: 0.64560608 | m = 4, n = 2: 0.64560608 |
| m = 2, n = 4: 0.067475608 | m = 2, n = 4: 0.067475608 |
| m = 0, n = 6: 0.040674688 | m = 0, n = 6: 0.040674688 |
| m = 6, n = 1: 0.34054159 | m = 6, n = 1: −0.34054159 |
| m = 4, n = 3: 0.18693421 | m = 4, n = 3: −0.18693421 |
| m = 2, n = 5: 0.007150644 | m = 2, n = 5: −0.0071506442 |
| m = 0, n = 7: 0.00271526 | m = 0, n = 7: −0.0027152603 |
| m = 8, n = 0: 0.006099753 | m = 8, n = 0: 0.0060997526 |
| m = 6, n = 2: 0.092716324 | m = 6, n = 2: 0.092716324 |
| m = 4, n = 4: 0.023069232 | m = 4, n = 4: 0.023069232 |
| m = 2, n = 6: 0.000185491 | m = 2, n = 6: 0.0001854912 |
| m = 0, n = 8: 5.99344e−05 | m = 0, n = 8: 5.9934422e−05 |
| m = 8, n = 1: 0.001486721 | m = 8, n = 1: −0.0014867211 |
| m = 6, n = 3: 0.008087659 | m = 6, n = 3: −0.0080876588 |
| m = 4, n = 5: 0.000963054 | m = 4, n = 5: −0.00096305378 |

TABLE 4

| Cmn2_1 | Cmn2_2 |
|---|---|
| m = 0, n = 1: 4.126941 | m = 0, n = 1: −4.126941 |
| m = 2, n = 0: −0.41704482 | m = 2, n = 0: −0.41704482 |
| m = 0, n = 2: 6.5578331 | m = 0, n = 2: 6.5578331 |
| m = 2, n = 1: −1.3349282 | m = 2, n = 1: 1.3349282 |
| m = 0, n = 3: 4.2274449 | m = 0, n = 3: −4.2274449 |
| m = 4, n = 0: 0.57989143 | m = 4, n = 0: 0.57989143 |

TABLE 4-continued

| Cmn2_1 | Cmn2_2 |
|---|---|
| m = 2, n = 2: −0.53017686 | m = 2, n = 2: −0.53017686 |
| m = 0, n = 4: 2.0561566 | m = 0, n = 4: 2.0561566 |
| m = 4, n = 1: 0.41393656 | m = 4, n = 1: −0.41393656 |
| m = 2, n = 3: −0.05432783 | m = 2, n = 3: 0.05432783 |
| m = 0, n = 5: 0.58605319 | m = 0, n = 5: −0.58605319 |
| m = 6, n = 0: 0.31023519 | m = 6, n = 0: 0.31023519 |
| m = 4, n = 2: 0.46196894 | m = 4, n = 2: 0.46196894 |
| m = 2, n = 4: 0.005799915 | m = 2, n = 4: 0.0057999148 |
| m = 0, n = 6: 0.095577293 | m = 0, n = 6: 0.095577293 |
| m = 6, n = 1: 0.25433855 | m = 6, n = 1: −0.25433855 |
| m = 4, n = 3: 0.046292184 | m = 4, n = 3: −0.046292184 |
| m = 2, n = 5: −0.000825933 | m = 2, n = 5: 0.00082593302 |
| m = 0, n = 7: 0.00797778 | m = 0, n = 7: −0.0079777803 |
| m = 8, n = 0: 0.000243206 | m = 8, n = 0: 0.00024320633 |
| m = 6, n = 2: 0.064366742 | m = 6, n = 2: 0.064366742 |
| m = 4, n = 4: −0.001273274 | m = 4, n = 4: −0.0012732741 |
| m = 2, n = 6: −0.000323851 | m = 2, n = 6: −0.00032385128 |
| m = 0, n = 8: 0.000251122 | m = 0, n = 8: 0.00025112212 |
| m = 8, n = 1: 0.000205228 | m = 8, n = 1: −0.00020522791 |
| m = 6, n = 3: 0.005264855 | m = 6, n = 3: −0.0052648552 |
| m = 4, n = 5: −0.000606115 | m = 4, n = 5: 0.00060611458 |

In further another example, the values of Cmn1_1 and Cmn1_2 and the values of Cmn2_1 and Cmn2_2 are shown in Table 5 and Table 6, respectively.

TABLE 5

| Cmn1_1 | Cmn1_2 |
|---|---|
| m = 0, n = 1: 4.226872 | m = 0, n = 1: −4.226872 |
| m = 2, n = 0: 2.3683177 | m = 2, n = 0: 2.3683177 |
| m = 0, n = 2: 6.2731217 | m = 0, n = 2: 6.2731217 |
| m = 2, n = 1: −0.13076123 | m = 2, n = 1: 0.13076123 |
| m = 0, n = 3: 4.7993221 | m = 0, n = 3: −4.7993221 |
| m = 4, n = 0: 0.37003974 | m = 4, n = 0: 0.37003974 |
| m = 2, n = 2: 0.24139937 | m = 2, n = 2: 0.24139937 |
| m = 0, n = 4: 2.8234514 | m = 0, n = 4: 2.8234514 |
| m = 4, n = 1: 0.91543522 | m = 4, n = 1: −0.91543522 |
| m = 2, n = 3: 0.23909709 | m = 2, n = 3: −0.23909709 |
| m = 0, n = 5: 0.30600293 | m = 0, n = 5: −0.30600293 |
| m = 6, n = 0: 0.38812337 | m = 6, n = 0: 0.38812337 |
| m = 4, n = 2: 0.64560608 | m = 4, n = 2: 0.64560608 |
| m = 2, n = 4: 0.067475608 | m = 2, n = 4: 0.067475608 |
| m = 0, n = 6: 0.040674688 | m = 0, n = 6: 0.040674688 |
| m = 6, n = 1: 0.34054159 | m = 6, n = 1: −0.34054159 |
| m = 4, n = 3: 0.18693421 | m = 4, n = 3: −0.18693421 |
| m = 2, n = 5: 0.007150644 | m = 2, n = 5: −0.0071506442 |
| m = 0, n = 7: 0.00271526 | m = 0, n = 7: −0.0027152603 |
| m = 8, n = 0: 0.006099753 | m = 8, n = 0: 0.0060997526 |
| m = 6, n = 2: 0.092716324 | m = 6, n = 2: 0.092716324 |
| m = 4, n = 4: 0.023069232 | m = 4, n = 4: 0.023069232 |
| m = 2, n = 6: 0.000185491 | m = 2, n = 6: 0.0001854912 |
| m = 0, n = 8: 5.99344e−05 | m = 0, n = 8: 5.9934422e−05 |
| m = 8, n = 1: 0.001486721 | m = 8, n = 1: −0.0014867211 |
| m = 6, n = 3: 0.008087659 | m = 6, n = 3: −0.0080876588 |
| m = 4, n = 5: 0.000963054 | m = 4, n = 5: −0.00096305378 |

TABLE 6

| Cmn2_1 | Cmn2_2 |
|---|---|
| m = 0, n = 1: 4.126941 | m = 0, n = 1: −4.126941 |
| m = 2, n = 0: −0.41704482 | m = 2, n = 0: −0.41704482 |
| m = 0, n = 2: 6.5578331 | m = 0, n = 2: 6.5578331 |
| m = 2, n = 1: −1.3349282 | m = 2, n = 1: 1.3349282 |
| m = 0, n = 3: 4.2274449 | m = 0, n = 3: −4.2274449 |
| m = 4, n = 0: 0.16889143 | m = 4, n = 0: 0.16889143 |
| m = 2, n = 2: −0.53017686 | m = 2, n = 2: −0.53017686 |
| m = 0, n = 4: 1.3784146 | m = 0, n = 4: 1.3784146 |
| m = 4, n = 1: 0.41393656 | m = 4, n = 1: −0.41393656 |
| m = 2, n = 3: −0.05432783 | m = 2, n = 3: 0.05432783 |
| m = 0, n = 5: 0.58605319 | m = 0, n = 5: −0.58605319 |
| m = 6, n = 0: 0.31023519 | m = 6, n = 0: 0.31023519 |

TABLE 6-continued

| Cmn2_1 | Cmn2_2 |
|---|---|
| m = 4, n = 2: 0.26196894 | m = 4, n = 2: 0.26196894 |
| m = 2, n = 4: 0.005799915 | m = 2, n = 4: 0.0057999148 |
| m = 0, n = 6: 0.095577293 | m = 0, n = 6: 0.095577293 |
| m = 6, n = 1: 0.25433855 | m = 6, n = 1: −0.25433855 |
| m = 4, n = 3: 0.046292184 | m = 4, n = 3: −0.046292184 |
| m = 2, n = 5: −0.000825933 | m = 2, n = 5: 0.00082593302 |
| m = 0, n = 7: 0.00797778 | m = 0, n = 7: −0.0079777803 |
| m = 8, n = 0: 0.000243206 | m = 8, n = 0: 0.00024320633 |
| m = 6, n = 2: 0.064366742 | m = 6, n = 2: 0.064366742 |
| m = 4, n = 4: −0.001273274 | m = 4, n = 4: −0.0012732741 |
| m = 2, n = 6: −0.000323851 | m = 2, n = 6: −0.00032385128 |
| m = 0, n = 8: 0.000251122 | m = 0, n = 8: 0.00025112212 |
| m = 8, n = 1: 0.000205228 | m = 8, n = 1: −0.00020522791 |
| m = 6, n = 3: 0.005264855 | m = 6, n = 3: −0.0052648552 |
| m = 4, n = 5: −0.000606115 | m = 4, n = 5: 0.00060611458 |

The following several statements should be noted.

(1) In order to distinguish each sub lens of the curved lens more clearly, the drawing shows the boundaries between adjacent sub lenses of the curved lens or the boundaries of the plurality of display channels of a display system including the curved lens; however, in actual products, the above boundaries do not exist.

(2) In some examples, "plurality of" means "greater than or equal to two".

(3) In some examples, the light incident surface and the light exit surface of the curved lens are relative to the propagation direction of light emitted by the display screen in the final display device. For example, the light emitted by the display screen enters the curved lens through the light incident surface, and then leaves the curved lens through the light exit surface.

(4) In some examples, the curved lens may not be provided with the mounting portion. In this case, the curved lens can be arranged in the display system through the mounting portion of the display system.

(5) Applicable components can be used for other components of the display device (for example, thin film transistors, control devices, image data encoding/decoding devices, row scan drivers, column scan drivers, clock circuits, etc.), all of which should be understood by those skilled in the art, and will not be repeated here, and should not be construed as a limitation to the present disclosure.

Although the present disclosure has been described in detail with above general descriptions and specific implementations, it is obvious to those skilled in the art that some modifications or improvements can be made on the basis of the embodiments of the present disclosure. Therefore, these modifications or improvements made on the basis of not deviating from the spirit of the present disclosure fall within the protection scope required by the present disclosure.

The above descriptions are only specific embodiments of the present disclosure, but the protection scope of the present disclosure is not limited thereto, the protection scope of the present disclosure should be determined by the claims.

What is claimed is:

1. A curved lens, comprising: a plurality of sub lenses around an optical center of the curved lens and connected with each other;
   wherein each of the plurality of sub lenses comprises a first curved surface and a second curved surface opposite to each other;
   a plurality of first curved surfaces of the plurality of sub lenses are connected with each other to form a light exit surface of the curved lens, and a plurality of the second curved surfaces of the plurality of sub lenses are connected with each other to form a light incident surface of the curved lens, and the light exit surface is closer to the optical center of the curved lens compared with the light incident surface;

the light incident surface as a whole is a convex surface, and the light exit surface as a whole is a concave surface; and the plurality of the first curved surfaces and the plurality of the second curved surfaces are free-form curved surfaces, wherein a central thickness of each of the plurality of sub lenses is greater than 2.5 mm, an edge thickness of each of the plurality of sub lenses is greater than 1.2 mm, and a ratio of the central thickness to the edge thickness of each of the plurality of sub lenses ranges from 1.8 to 2.7.

2. The curved lens according to claim 1, wherein the plurality of sub lenses are identical to each other.

3. The curved lens according to claim 1, wherein a number of the plurality of sub lenses is an odd number.

4. The curved lens according to claim 1, wherein an angle between adjacent first curved surfaces is greater than 120 degrees.

5. The curved lens according to claim 1, wherein each of the plurality of sub lenses comprises a plurality of sub-sub lenses around the optical center and connected with each other;

each of the sub-sub lenses comprises a first sub curved surface and a second sub curved surface opposite to each other;

the first sub curved surface is a first free-form curved surface, and the second sub curved surface is a second free-form curved surface; and a plurality of first sub curved surfaces of the plurality of sub-sub lenses are connected with each other to form the first curved surface, and a plurality of second sub curved surfaces of the plurality of sub-sub lenses are connected with each other to form the second curved surface.

6. The curved lens according to claim 5, wherein each of the plurality of sub lenses comprises two sub-sub lenses, and the two sub-sub lenses are symmetrically relative to a first plane.

7. The curved lens according to claim 5, wherein an angle between adjacent first sub curved surfaces is greater than 140 degrees.

8. The curved lens according to claim 5, wherein a surface shape z1 (x, y) of each of the plurality of first sub curved surfaces and a surface shape z2 (x, y) of each of the plurality of second sub curved surfaces satisfy following expressions (1) and (2), respectively:

$$z1(x, y) = \frac{c1 y^2}{1 + \sqrt{1 - (1+k1) c1^2 y^2}} + \sum_{m=0}^{P} \sum_{n=0}^{P} Cmn1 \times x^m y^n, \quad (1)$$

$$z2(x, y) = \frac{c2 y^2}{1 + \sqrt{1 - (1+k2) c2^2 y^2}} + \sum_{m=0}^{P} \sum_{n=0}^{P} Cmn2 \times x^m y^n, \quad (2)$$

wherein c1 is a curvature radius of each of the plurality of first sub curved surfaces; k1 is a quadric surface constant of each of the plurality of first sub curved surfaces, Cmn1 is a coefficient of an (m−n)th order of each of the plurality of first sub curved surfaces; c2 is a curvature radius of each of the plurality of second sub curved surfaces; k2 is a quadric surface constant of each of the plurality of second sub curved surfaces; Cmn2 is a coefficient of an (m−n)th order of the plurality of second sub curved surfaces; and m+n is greater than or equal to 1 and less than or equal to P.

9. The curved lens according to claim 8, wherein in a case where a value of m is an odd number, values of Cmn1 and Cmn2 are zero; and in a case where a value of m+n is an odd number, a sum of coefficients of (m−n)th orders of the plurality of first sub curved surfaces is equal to zero, and a sum of coefficients of (m−n)th orders of the plurality of second sub curved surfaces is equal to zero.

10. The curved lens according to claim 8, wherein an absolute value of c2 is greater than an absolute value of c1; and a ratio of the absolute value of c2 to the absolute value of c1 ranges from 3 to 7.

11. The curved lens according to claim 5, wherein a first curved line obtained by sectioning two adjacent first curved surfaces by a first plane comprises a portion of a first M-shape;

the portion of the first M-shape comprises two first convex points, and the first curved line is entirely on a same side of a virtual line connecting the two first convex points;

a curved line obtained by sectioning two adjacent second curved surfaces by the first plane comprises a ridge-shaped portion;

a second curved line obtained by sectioning two adjacent first sub curved surfaces by a second plane comprises a portion of a second M-shape; and the portion of the second M-shape comprises two second convex points, and the second curved line is entirely on a same side of a virtual line connecting the two second convex points.

12. The curved lens according to claim 1, wherein the curved lens is integrally molded, so that there is no interface between adjacent sub lenses.

13. The curved lens according to claim 1 wherein pupils of the plurality of sub lenses are at different positions and around the optical center of the curved lens.

14. The curved lens according to claim 13, wherein the optical center of the curved lens is on a side of the pupils of the plurality of sub lenses away from the curved lens.

15. The curved lens according to claim 13, wherein the optical center of the curved lens is an intersection point of axes of the plurality of sub lenses; and an axis of each of the plurality of sub lenses is perpendicular to a plane where a pupil of the each of the plurality of sub lenses are located.

16. A display device, comprising the curved lens according to claim 1.

17. The display device according to claim 16, further comprising a plurality of display channels, wherein the plurality of sub lenses of the curved lens are in one-to-one correspondence with the plurality of display channels; and each of the plurality of sub lenses is arranged in a corresponding display channel.

18. The display device according to claim 17, wherein imaging surfaces of the plurality of display channels are on a same curved surface or on a same plane.

19. The display device according to claim 18, wherein in a case where the imaging surfaces of the plurality of display channels are on the same plane, the imaging surfaces of the plurality of display channels are all perpendicular to a global axis of the curved lens.

\* \* \* \* \*